US012559117B2

(12) United States Patent
Ando et al.

(10) Patent No.: US 12,559,117 B2
(45) Date of Patent: Feb. 24, 2026

(54) VEHICLE

(71) Applicant: TOYOTA JIDOSHA KABUSHIKI KAISHA, Toyota (JP)

(72) Inventors: Eisuke Ando, Nagoya (JP); Takehito Fujii, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 18/487,412

(22) Filed: Oct. 16, 2023

(65) Prior Publication Data

US 2024/0132089 A1     Apr. 25, 2024
US 2024/0227830 A9     Jul. 11, 2024

(30) Foreign Application Priority Data

Oct. 20, 2022    (JP) ................................. 2022-168230

(51) Int. Cl.
*B60W 50/10*          (2012.01)
*B60Q 1/08*           (2006.01)
*B60S 1/58*           (2006.01)
*B60W 60/00*          (2020.01)

(52) U.S. Cl.
CPC ............... *B60W 50/10* (2013.01); *B60Q 1/08* (2013.01); *B60S 1/583* (2013.01); *B60W 60/0059* (2020.02); *B60W 2510/20* (2013.01)

(58) Field of Classification Search
None
See application file for complete search history.

(56) References Cited

U.S. PATENT DOCUMENTS

2021/0245654 A1*    8/2021   Ando ....................... B60Q 1/52

FOREIGN PATENT DOCUMENTS

JP          2018-132015 A     8/2018

* cited by examiner

*Primary Examiner* — James J Lee
*Assistant Examiner* — Elizabeth Galyn Martinez
(74) *Attorney, Agent, or Firm* — Oliff PLC

(57)          ABSTRACT

When a headlight driver input indicates an AUTO mode, a VCIB accepts a headlight mode request from an ADK. The VCIB identifies a current headlight driver input. The VCIB reads first correspondence information and checks the identified headlight driver input and the accepted headlight mode request against the first correspondence information to determine an illumination status of a headlight.

2 Claims, 23 Drawing Sheets

FIG.4

Headlight_Driver_Input

| Value | Description | Remarks |
|-------|-------------|---------|
| 0 | OFF | – |
| 1 | TAIL mode ON | – |
| 2 | LO mode ON | – |
| 3 | AUTO mode ON | – |
| 4 | HI mode ON | |
| 5–6 | reserved | |
| 7 | invalid | |

FIG.5

Headlight_Mode_Command

| Value | Description | Remarks |
|---|---|---|
| 0 | No request | NO REQUEST |
| 1 | TAIL mode request | TAIL MODE REQUEST side lamp mode |
| 2 | HEAD mode request | HEAD MODE REQUEST Lo mode |
| 3 | AUTO mode request | AUTO MODE REQUEST |
| 4 | HI mode request | HI MODE REQUEST |
| 5 | OFF mode request | OFF MODE REQUEST |
| 6-7 | reserved | |

FIG.6

Headlight mode status according to the Driver input and Headlight_Mode_Command

| Driver input | | | Headlight_Mode_Command from ADK | | | | | |
|---|---|---|---|---|---|---|---|---|
| | | No request | OFF | TAIL | HEAD | AUTO | HI |
| OFF/TAIL/HEAD/AUTO (Lever status is normal) | OFF | OFF | Latest | Latest | Latest | Latest | HI |
| | TAIL | TAIL | Latest | Latest | Latest | Latest | Latest |
| | HEAD | HEAD | Latest | Latest | Latest | Latest | Latest |
| | AUTO | AUTO | Latest | Latest | Latest | Latest | Latest |
| HI (Lever status is Hi) | OFF | OFF | Latest | Latest | Latest | Latest | HI |
| | TAIL | TAIL | Latest | Latest | Latest | Latest | Latest |
| | HEAD | HI | Latest | Latest | HI | HI | HI |
| | AUTO | HI | Latest | Latest | HI | HI | HI |

Latest: latest ringing/falling edge

FIG.8

Windshieldwiper_Front_Driver_Input

| Value | Description | Remarks |
|---|---|---|
| 0 | OFF | OFF POSITION  OFF position |
| 1 | LO | LO MODE POSITION  LO mode position |
| 2 | HI | HI MODE POSITION  HI mode position |
| 3 | Intermittent | INTERMITTENT OPERATION MODE POSITION<br>Intermittent mode position |
| 4 | AUTO | AUTO MODE POSITION<br>AUTO mode position |
| 5 | MIST | MIST MODE (ONE TIME WIPING) POSITION<br>MIST mode (one time wiping) position |
| 6 | reserved | |
| 7 | invalid | |

FIG.9

Windshieldwiper_Mode_Front_Command

| Value | Description | Remarks |
|---|---|---|
| 0 | OFF mode request | STOP REQUEST |
| 1 | LO mode request | LO MODE REQUEST |
| 2 | HI mode request | HI MODE REQUEST |
| 3 | Intermittent mode request | INTERMITTENT OPERATION MODE REQUEST |
| 4 | AUTO mode request | AUTO MODE REQUEST |
| 5 | MIST mode request | MIST MODE (ONE TIME WIPING REQUEST) One-Time Wiping |
| 6, 7 | Reserved | |

FIG.10

Front windshield wiper status according to the combination switch and ADK command

| Front windshield wiper command | Combination switch position by driver operation (COMBINATION SWITCH POSITION BY DRIVER OPERATION) | | | | | |
|---|---|---|---|---|---|---|
| | OFF | LO | HI | Intermittent | AUTO | MIST |
| OFF | OFF | LO | HI | Intermittent | OFF | LO |
| LO | LO | LO | HI | LO | LO | LO |
| HI | HI | HI | HI | HI | HI | HI |
| Intermittent | Intermittent | LO | HI | LO | Intermittent | LO |
| AUTO | OFF* | LO | HI | Intermittent | OFF* | LO |
| MIST | LO | LO | HI | LO | LO | LO |

*If a raindrop sensor does not react, wiper does not move in "AUTO"

FIG. 12

Windshieldwiper_Rear_Driver_Input

| Value | Description | Remarks |
|-------|-------------|---------|
| 0 | OFF | OFF POSITION  Off position |
| 1 | LO | LO MODE POSITION  Lo mode position |
| 2 | reserved | |
| 3 | Inermittent | INTERMITTENT ACTIVATION MODE POSITION  Intermittent mode position |
| 4-6 | reserved | |
| 7 | invalid | |

FIG.13

Windshieldwiper_Mode_Rear_Command

| Value | Description | Remarks |
|---|---|---|
| 0 | OFF mode request | STOP REQUEST |
| 1 | LO mode request | LO MODE REQUEST |
| 2 | reserved | |
| 3 | Intermittent mode request | INTERMITTENT OPERATION MODE REQUEST |
| 4,~7 | reserved | |

FIG.14

Rear windshield wiper status according to the combination switch and ADK command

| Rear windshield wiper command | Combination switch position by driver operation (COMBINATION SWITCH POSITION BY DRIVER OPERATION) | | |
|---|---|---|---|
| | OFF | LO | Intermittent |
| OFF | OFF | LO | Intermittent |
| LO | LO | LO | LO |
| Intermittent | Intermittent | LO | Intermittent |

FIG.18

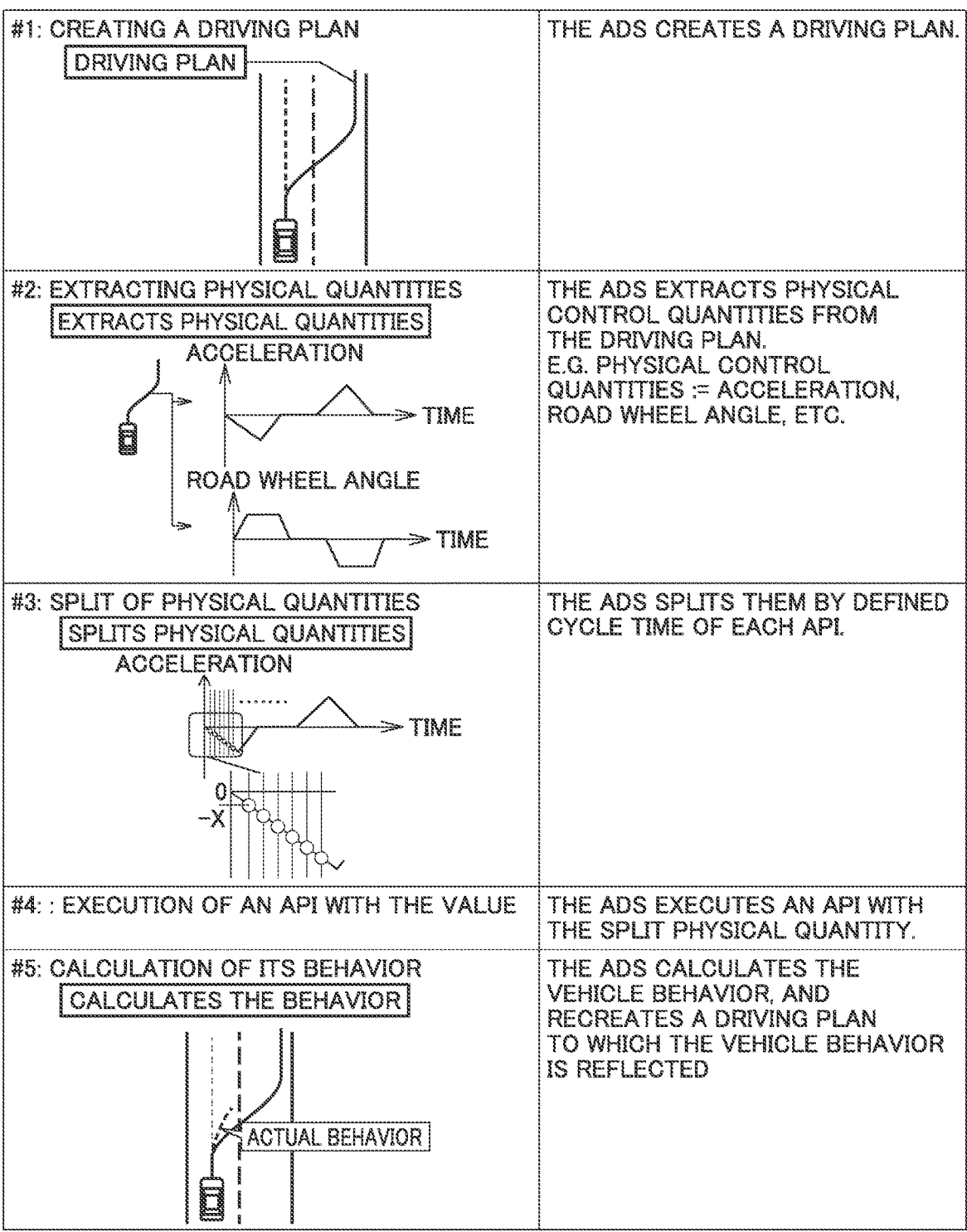

| #1: CREATING A DRIVING PLAN | THE ADS CREATES A DRIVING PLAN. |
| --- | --- |
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE

CROSS REFERENCE TO RELATED APPLICATIONS

This nonprovisional application is based on Japanese Patent Application No. 2022-168230 filed with the Japan Patent Office on Oct. 20, 2022, the entire contents of which are hereby incorporated by reference.

BACKGROUND

Field

The present disclosure relates to a vehicle configured to be capable of autonomous driving.

Description of the Background Art

Development of a technique relating to autonomous driving of a vehicle has recently progressed. For example, Japanese Patent Laying-Open No. 2018-132015 discloses a vehicle including a motive power system that manages motive power of the vehicle in a centralized manner, a power supply system that manages supply of electric power to various vehicle-mounted devices in a centralized manner, and an autonomous driving system that carries out autonomous driving control of the vehicle in a centralized manner.

SUMMARY

Determination by the autonomous driving system as to operations of various devices such as a headlight, a front wiper, a rear wiper, and the like may be different from determination by a user. In this case, prioritization of determination by any one of them in a uniform manner may not lead to optimal operations of the various devices.

The present disclosure was made to solve the problem above, and an object thereof is to achieve optimal operations of various devices when determination by an autonomous driving system as to operations of the various devices is different from determination by a user.

(1) A vehicle according to one aspect of this disclosure is a vehicle on which an autonomous driving system is mountable. The vehicle includes a vehicle platform that carries out vehicle control in accordance with a command from the autonomous driving system and a vehicle control interface box that interfaces between the vehicle platform and the autonomous driving system. The vehicle platform includes a device and a manipulation apparatus for a user to give an instruction about an operation of the device. The vehicle control interface box accepts an operation request for the device from the autonomous driving system. Correspondence information for determination of an operation status of the device is stored in the vehicle control interface box. When a manipulation request based on a user operation onto the manipulation apparatus and the operation request are different from each other, the vehicle control interface box determines the operation status of the device based on the manipulation request, the operation request, and the correspondence information.

According to the configuration, the correspondence information for determination as to the operation status of the device is stored in the vehicle control interface box. When the manipulation request and the operation request are different from each other, the vehicle control interface box can determine the operation status of the device by checking the manipulation request and the operation request against the correspondence information. Appropriate determination of the correspondence information can lead to an optimal operation of the device when the manipulation request and the operation request are different from each other.

(2) In one embodiment, the device includes a headlight. The headlight includes an OFF mode, a TAIL mode, a HEAD mode, an AUTO mode, and a HI mode as operation modes. The vehicle control interface box accepts the operation request when the manipulation request requests the AUTO mode.

According to the configuration, when the user has selected the AUTO mode, the operation request from the autonomous driving system can be accepted.

(3) In one embodiment, the manipulation apparatus includes a first manipulation portion for switching between a first position to request the HI mode and a second position not to request the HI mode and a second manipulation portion configured to allow selection of the OFF mode, the TAIL mode, the HEAD mode, and the AUTO mode. When one of the manipulation request and the operation request requests the HI mode, the vehicle control interface box prioritizes the HI mode over the HEAD mode and the AUTO mode based on the correspondence information.

According to the configuration, when the manipulation request requests the HI mode (the first manipulation portion is located at the first position) or when the operation request requests the HI mode, the HI mode is prioritized over the HEAD mode and the AUTO mode based on the correspondence information. Such determination of the correspondence information can lead to the optimal operation of the headlight.

(4) In one embodiment, when the accepted operation request requests the OFF mode or the TAIL mode, the vehicle control interface box determines a last operation mode as the operation status of the headlight, based on the correspondence information.

According to the configuration, when the accepted operation request indicates the OFF mode or the TAIL mode, the last operation mode is determined as the operation status of the headlight. Determination of the correspondence information to derive such determination can lead to the optimal operation of the headlight.

(5) In one embodiment, when the second manipulation portion is switched from the AUTO mode to the OFF mode, the TAIL mode, or the HEAD mode while the accepted operation request requests the OFF mode or the TAIL mode, the vehicle control interface box determines a last operation mode as the operation status of the headlight, based on the correspondence information.

After the operation request is accepted, the user may switch the second manipulation portion from the AUTO mode to the OFF mode, the TAIL mode, or the HEAD mode. In this case, the last operation mode is determined as the operation status of the headlight. Determination of the correspondence information to derive such determination can lead to the optimal operation of the headlight.

(6) In one embodiment, when the operation request indicates the HEAD mode or the AUTO mode while the first manipulation portion is located at the first position and the AUTO mode has been selected by using the second manipulation portion, the vehicle control interface box determines the HI mode as the operation status of the headlight, based on the correspondence information. When the operation request indicates the HEAD mode or the AUTO mode while the first manipulation portion is located at the second position and the AUTO mode has been selected by using the second manipulation portion, the vehicle control interface box determines a last operation mode as the operation status of the headlight, based on the correspondence information.

According to the configuration, when the operation request indicating the HEAD mode or the AUTO mode is accepted, the operation status of the headlight which is different depending on whether the first manipulation portion is located at the first position or the second position is determined. Determination of the correspondence information to derive such determination can lead to the optimal operation of the headlight.

(7) In one embodiment, the device includes a front wiper. When the manipulation request and the operation request are different from each other, the vehicle control interface box determines the operation status of the front wiper in accordance with the request to cause the front wiper to more actively operate, based on the correspondence information.

According to the configuration, when the manipulation request and the operation request are different from each other, the operation status of the front wiper is determined to cause the front wiper to more actively operate. Determination of the correspondence information to derive such determination can lead to the optimal operation of the front wiper.

(8) In one embodiment, when one of the manipulation request and the operation request indicates a HI mode, the vehicle control interface box determines the HI mode as the operation status of the front wiper.

According to the configuration, when the manipulation request and the operation request are different from each other, the front wiper can be caused to more actively operate.

(9) In one embodiment, the device includes a rear wiper. When the manipulation request and the operation request are different from each other, the vehicle control interface box determines the operation status of the rear wiper in accordance with the request to cause the rear wiper to more actively operate, based on the correspondence information.

According to the configuration, the operation status of the rear wiper is determined to cause the rear wiper to more actively operate. Determination of the correspondence information to derive such determination can lead to the optimal operation of the rear wiper.

(10) In one embodiment, when one of the manipulation request and the operation request indicates a HI mode, the vehicle control interface box determines the HI mode as the operation status of the rear wipe.

According to the configuration, when the manipulation request and the operation request are different from each other, the rear wiper can be caused to more actively operate.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram for illustrating a headlight driver input.

FIG. 5 is a diagram for illustrating a light operation mode request.

FIG. 6 is a diagram for illustrating first correspondence information.

4

Figure 7:
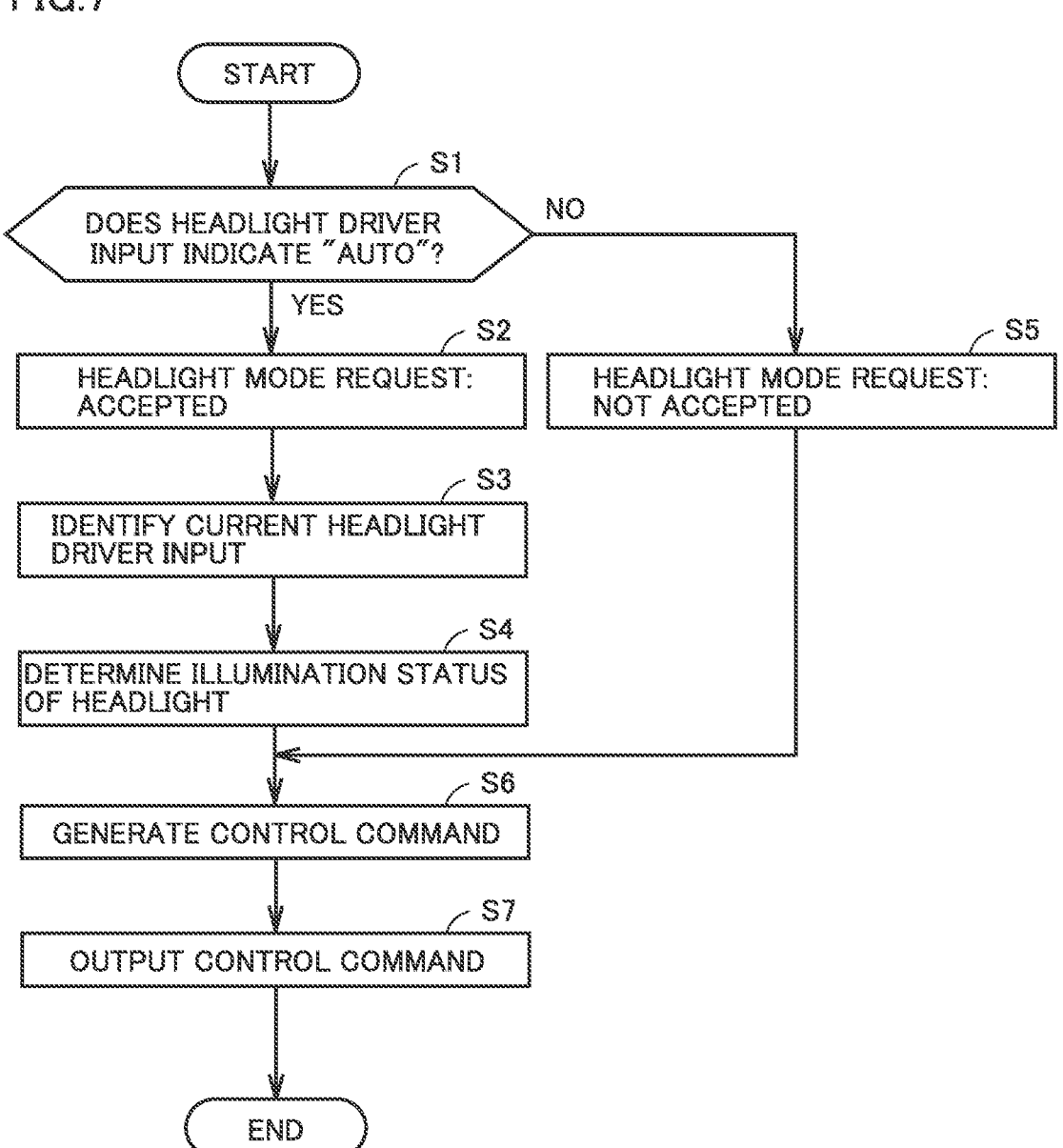

FIG. 7 is a flowchart showing a procedure of processing for determining a headlight mode status.

FIG. 8 is a diagram for illustrating a front wiper driver input.

FIG. 9 is a diagram for illustrating a front wiper operation mode request.

FIG. 10 is a diagram for illustrating second correspondence information.

Figure 11:
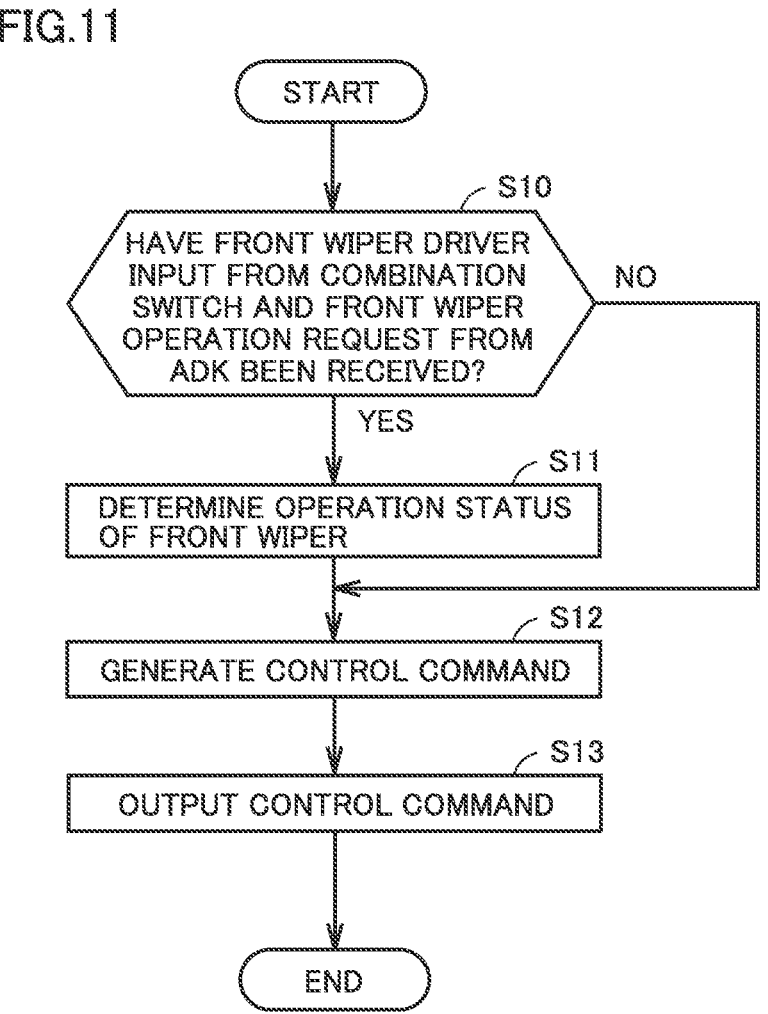

FIG. 11 is a flowchart showing a procedure of processing for determining a front wiper status.

FIG. 12 is a diagram for illustrating a rear wiper driver input.

FIG. 13 is a diagram for illustrating a rear wiper operation mode request.

FIG. 14 is a diagram for illustrating third correspondence information.

Figure 15:
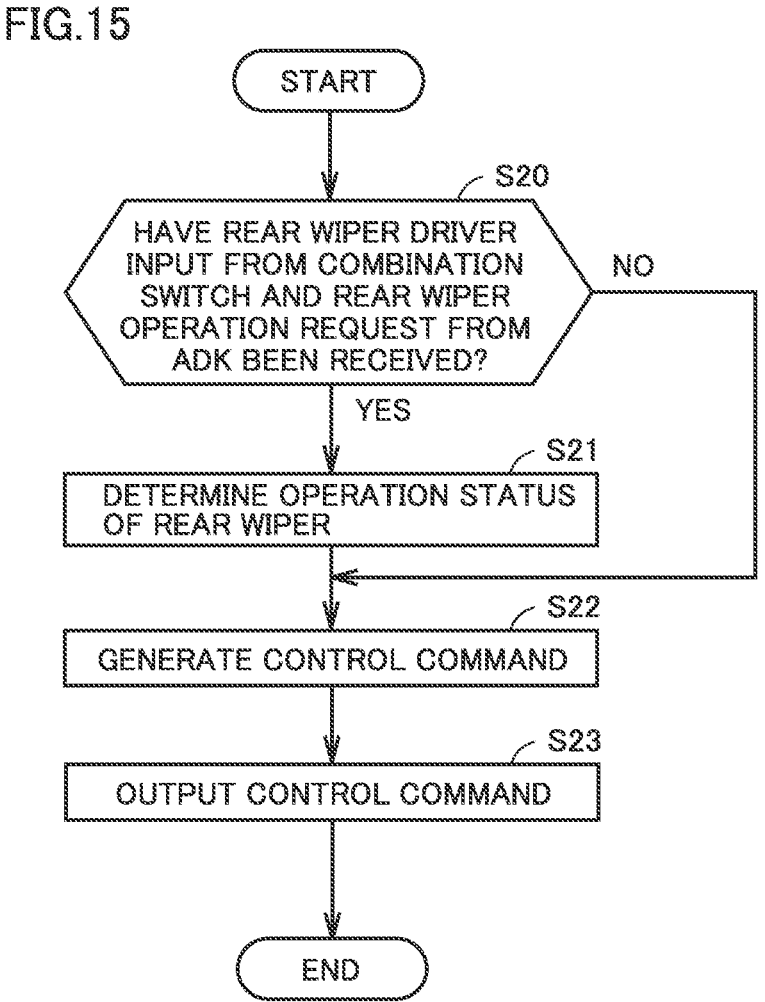

FIG. 15 is a flowchart showing a procedure of processing for determining a rear wiper status.

Figure 16:
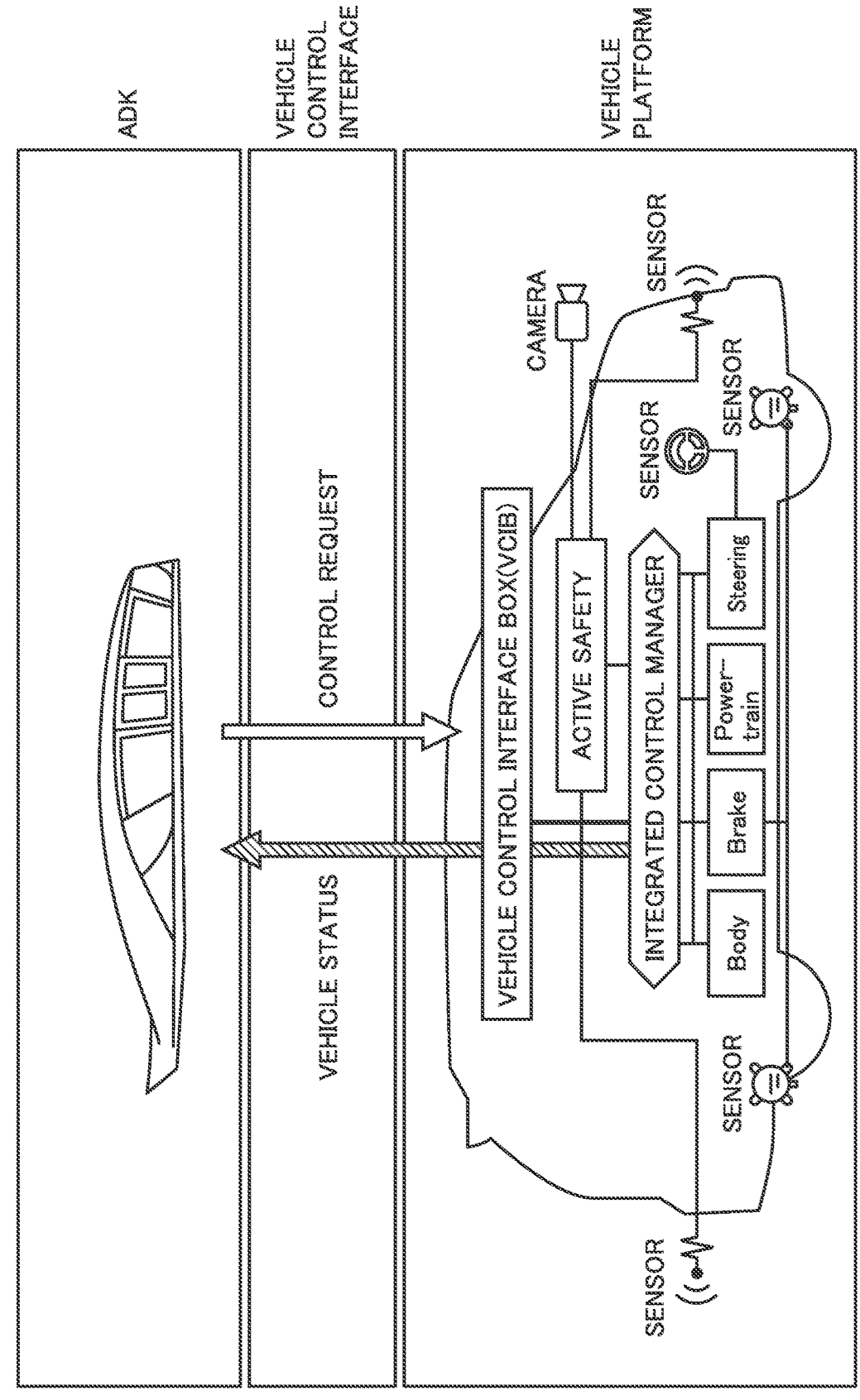

FIG. 16 is a diagram showing an overall structure of an Autono-MaaS vehicle.

Figure 17:
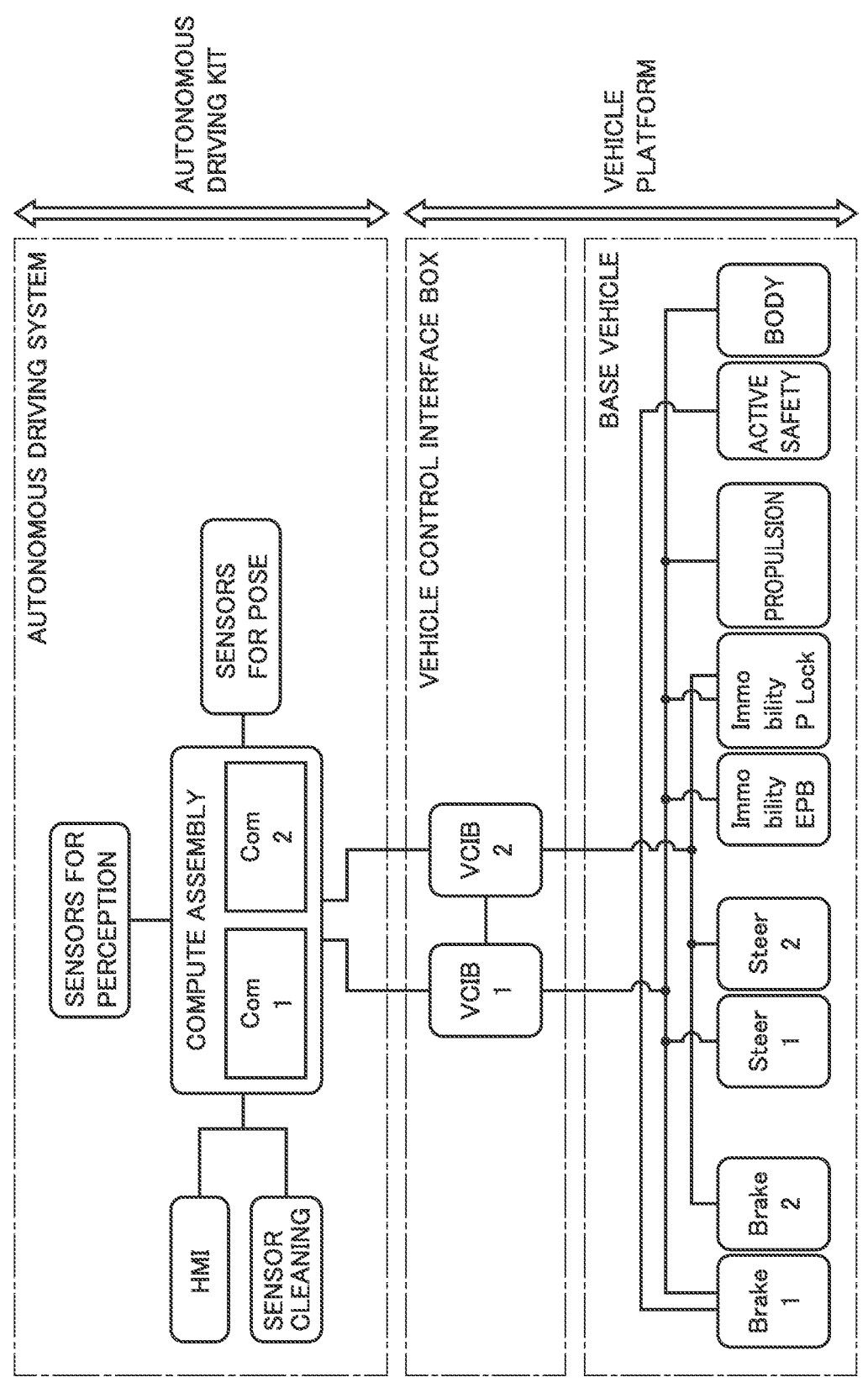

FIG. 17 is a diagram showing a system architecture of the Autono-MaaS vehicle.

FIG. 18 is a diagram showing a typical workflow in the ADS.

Figure 19:
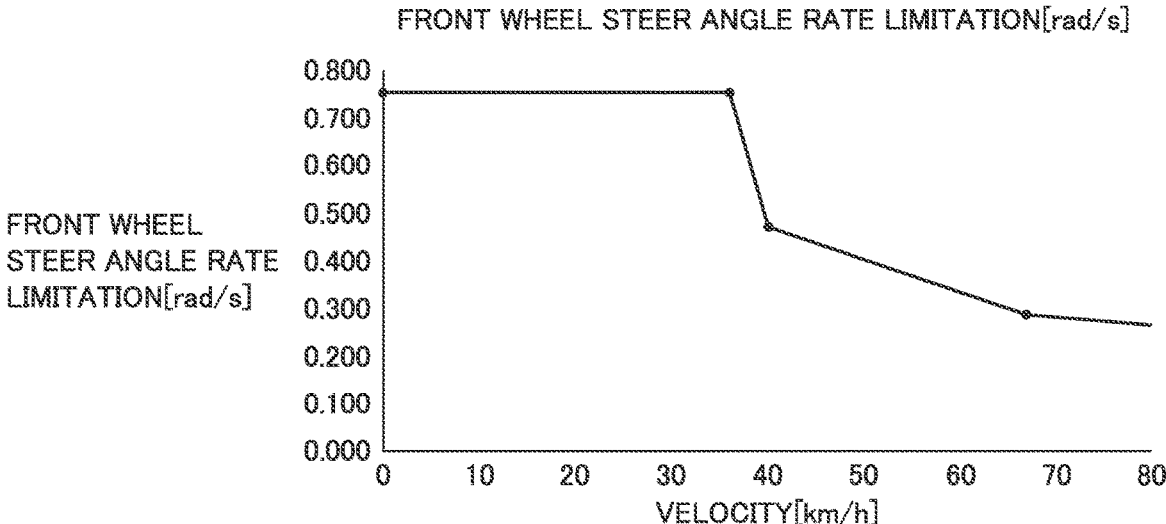

FIG. 19 is a diagram showing relation between a front wheel steer angle rate limitation and a velocity.

Figure 20:
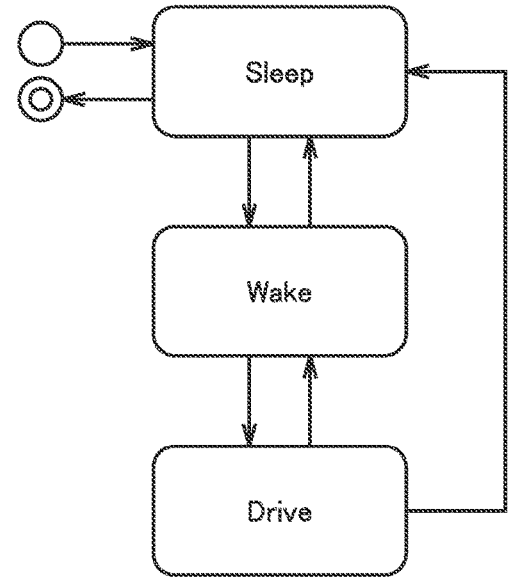

FIG. 20 is a state machine diagram of the power mode.

Figure 21:
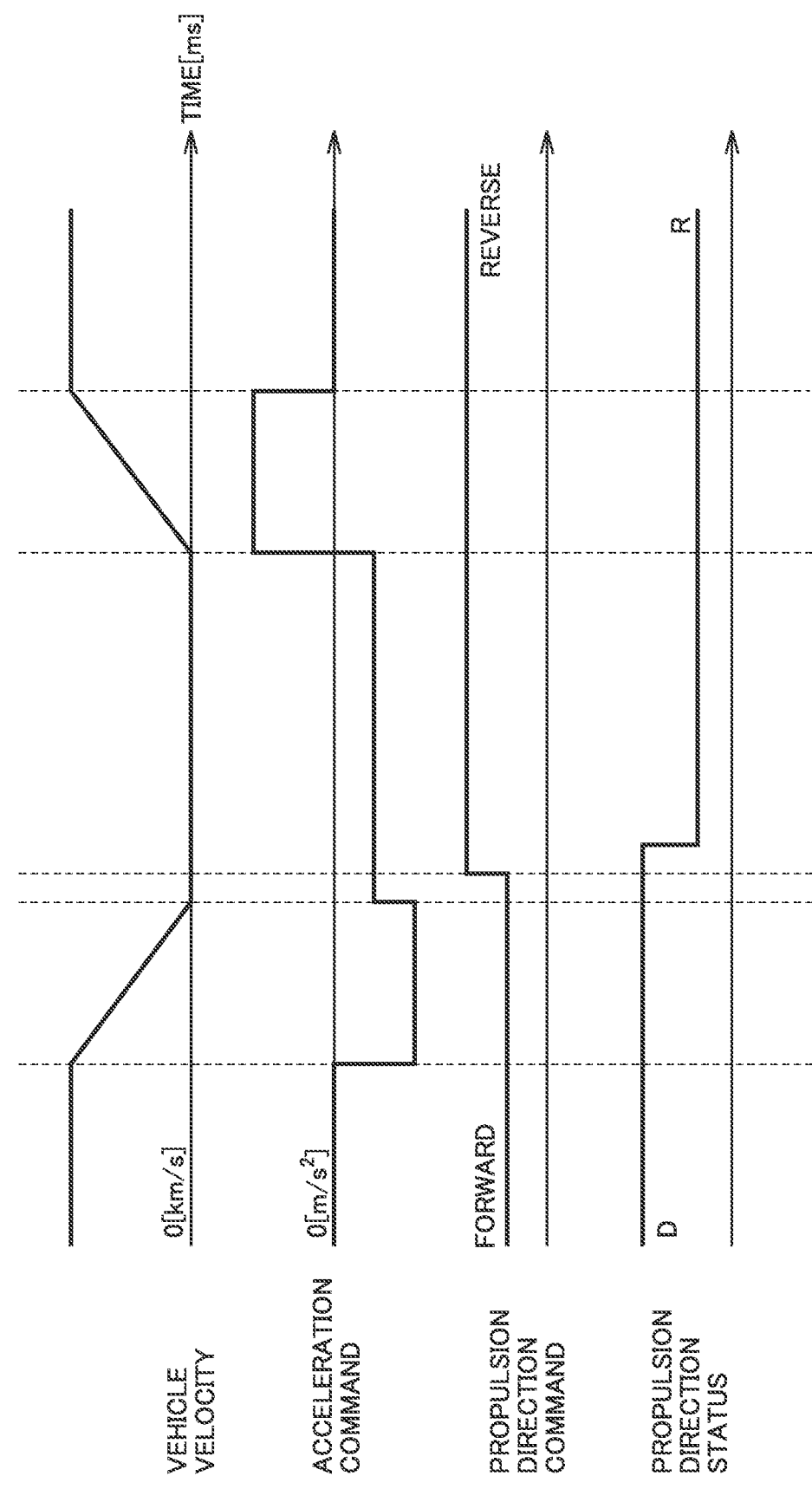

FIG. 21 is a diagram showing details of shift change sequences.

Figure 22:
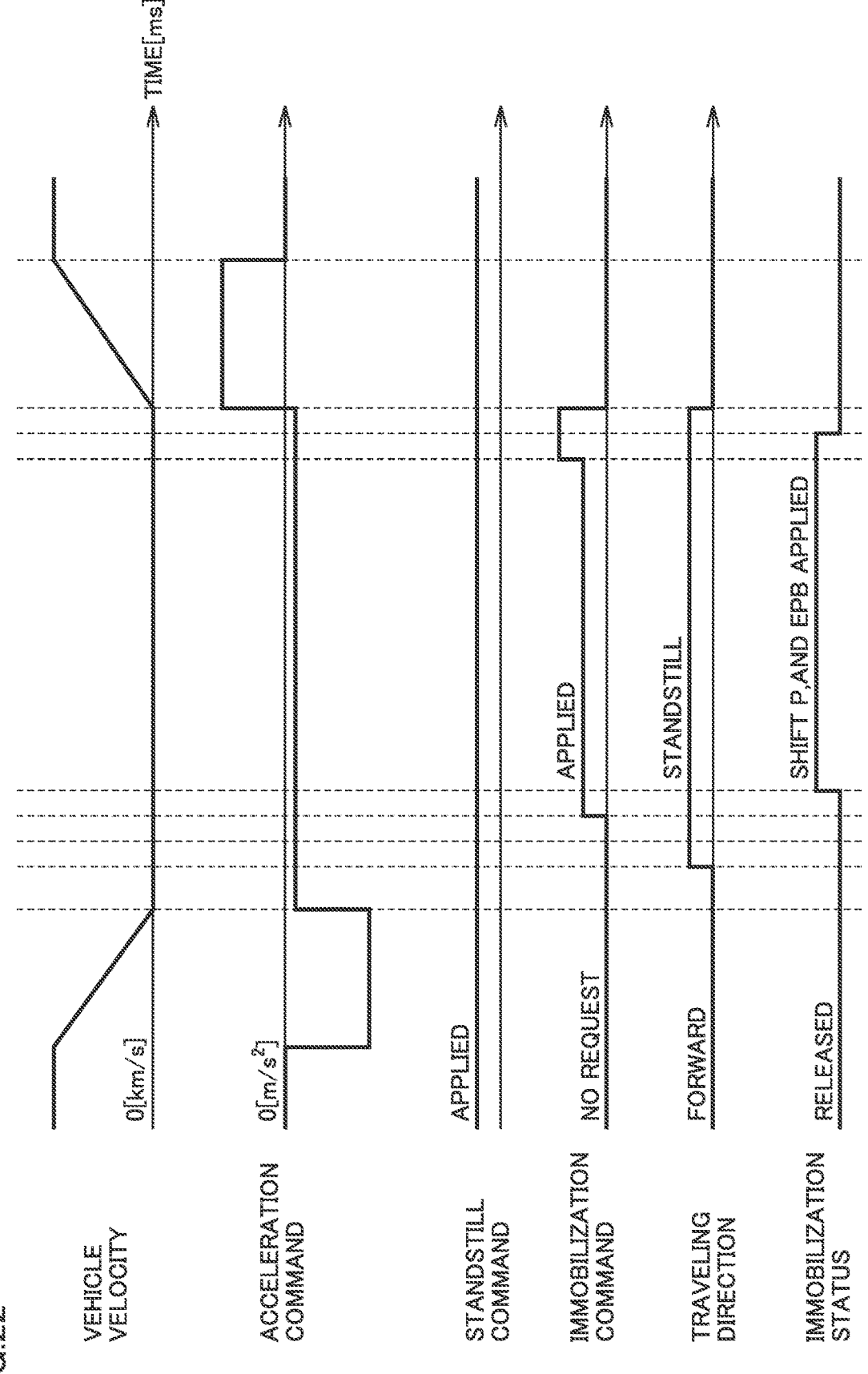

FIG. 22 is a diagram showing immobilization sequences.

Figure 23:
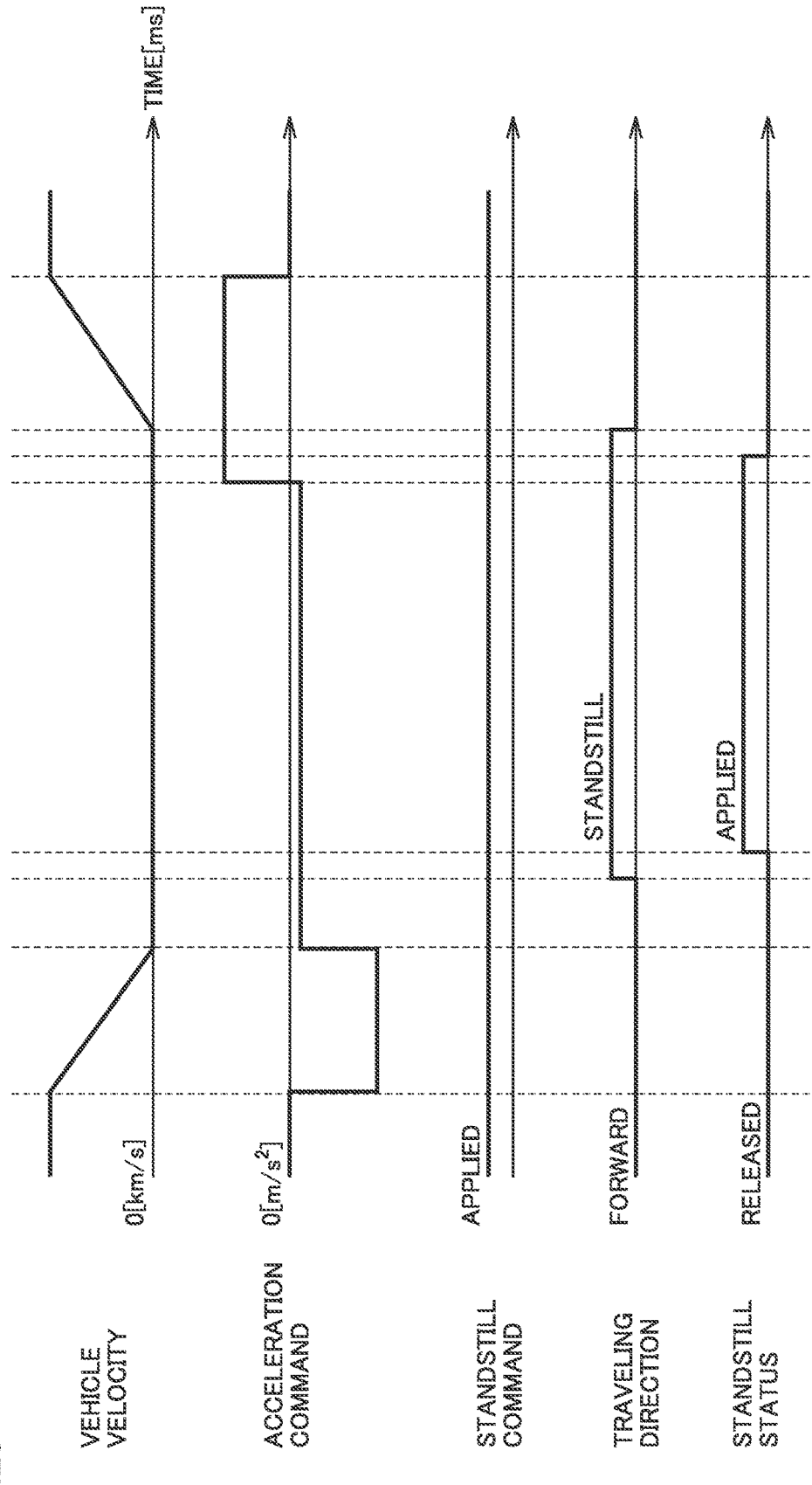

FIG. 23 is a diagram showing standstill sequences.

Figure 24:
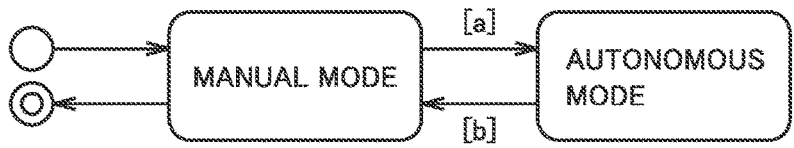

FIG. 24 is a state machine diagram of an autonomy state.

Figure 25:
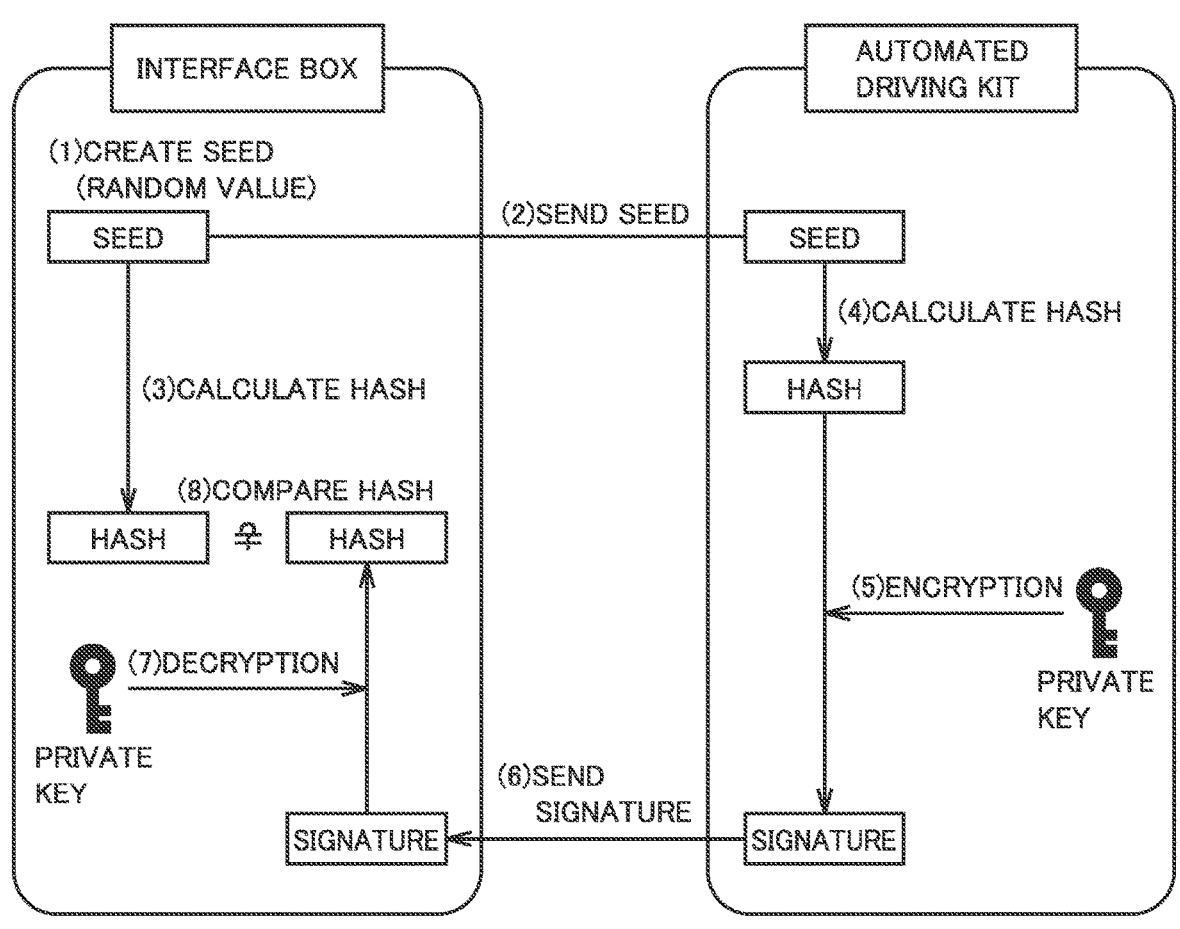

FIG. 25 is a diagram showing an authentication process.

DESCRIPTION OF THE PREFERRED EMBODIMENTS

An embodiment of the present disclosure will be described below in detail with reference to the drawings. The same or corresponding elements in the drawings have the same reference characters allotted and description thereof will not be repeated.
<Overall Configuration>

Figure 1:
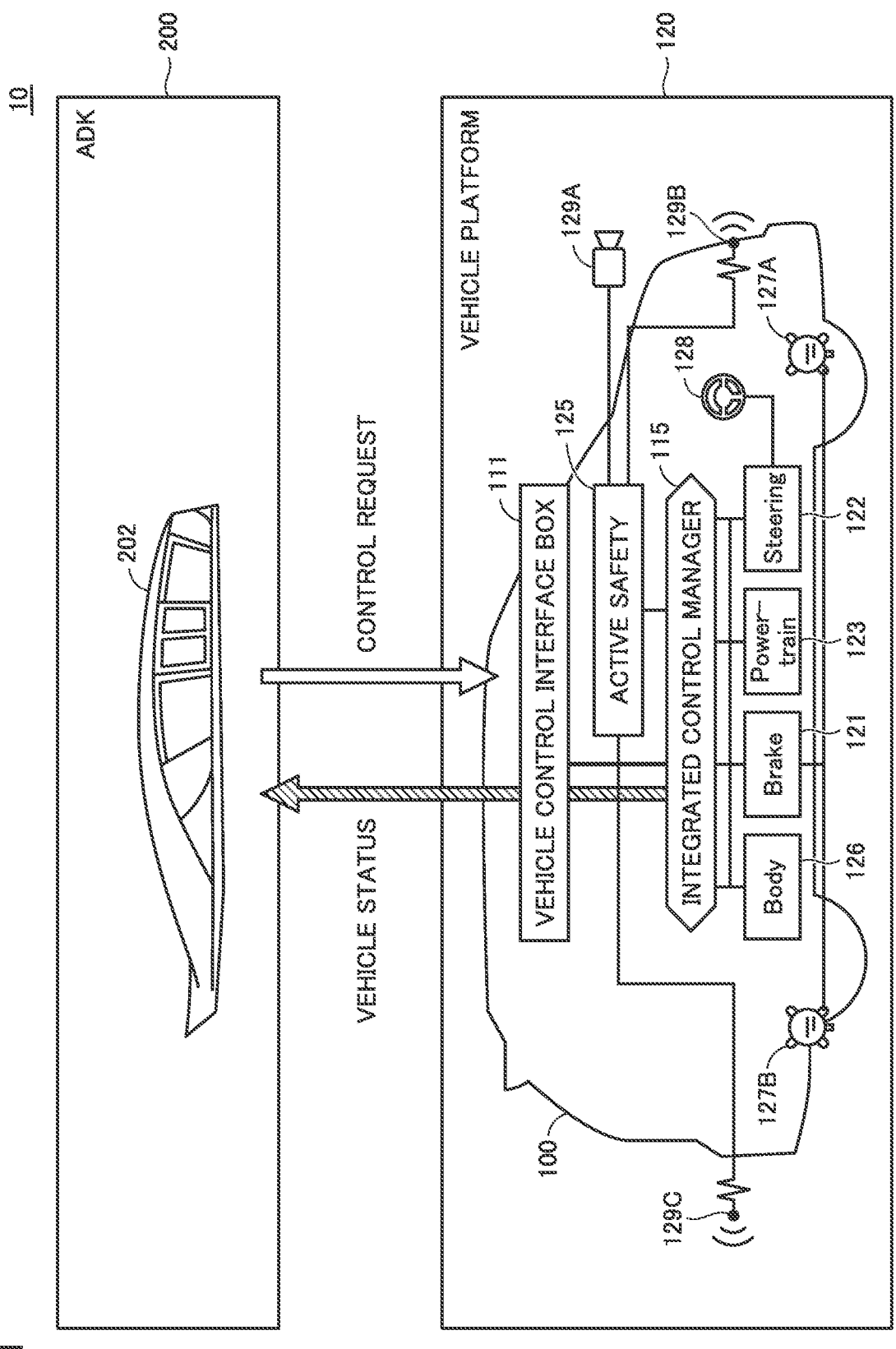
FIG. 1 is a diagram showing overview of a vehicle according to an embodiment of the present disclosure.

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 is configured as being attachable to (mountable on) VP 120. ADK 200 and VP 120 are configured to communicate with each other through a vehicle control interface box 111 (which will be described later) mounted on VP 120.

VP 120 can carry out autonomous driving in accordance with control requests (commands) from ADK 200. Though FIG. 1 shows VP 120 and ADK 200 at positions distant from each other, ADK 200 is actually attached to a rooftop or the like of a base vehicle 100 (which will be described later) included in VP 120. ADK 200 can also be removed from VP 120. While ADK 200 is not attached, VP 120 can travel by driving by a user. In this case, VP 120 carries out travel control (travel control in accordance with a user operation) in a manual mode.

ADK 200 includes an autonomous driving system (which is denoted as "ADS" below) 202 for autonomous driving of vehicle 10. For example, ADS 202 creates a driving plan of vehicle 10. Then, ADS 202 outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal. Then, ADS 202 has the received vehicle status reflected on creation of the driving plan. A detailed configuration of ADS 202 will be described later.

VP 120 includes base vehicle 100 and vehicle control interface box (which is denoted as "VCIB" below) 111.

Base vehicle 100 carries out various types of vehicle control in accordance with a control request from ADK 200 (ADS 202). Base vehicle 100 includes various systems and various sensors for controlling the vehicle. Specifically, base vehicle 100 includes an integrated control manager 115, a brake system 121, a steering system 122, a powertrain system 123, an active safety system 125, a body system 126, wheel speed sensors 127A and 127B, a pinion angle sensor 128, a camera 129A, and radar sensors 129B and 129C.

Integrated control manager 115 includes a processor and a memory, and integrally controls the systems (brake system 121, steering system 122, powertrain system 123, active safety system 125, and body system 126) involved with operations of the vehicle.

Brake system 121 is configured to control a braking apparatus provided in each wheel. The braking apparatus includes, for example, a disc brake system (not shown) that operates with a hydraulic pressure regulated by an actuator.

Wheel speed sensors 127A and 127B are connected to brake system 121. Wheel speed sensor 127A detects a rotation speed of a front wheel and outputs a detection value thereof to brake system 121. Wheel speed sensor 127B detects a rotation speed of a rear wheel and outputs a detection value thereof to brake system 121.

Brake system 121 generates a braking command to a braking apparatus in accordance with a prescribed control request outputted from ADK 200 through VCIB 111 and integrated control manager 115. Brake system 121 then controls the braking apparatus based on the generated braking command. Integrated control manager 115 can calculate a speed of the vehicle (vehicle speed) based on the rotation speed of each wheel.

Steering system 122 is configured to control a steering angle of a steering wheel of the vehicle with a steering apparatus. The steering apparatus includes, for example, rack-and-pinion electric power steering (EPS) that allows adjustment of a steering angle by an actuator.

Pinion angle sensor 128 is connected to steering system 122. Pinion angle sensor 128 detects an angle of rotation (a pinion angle) of a pinion gear coupled to a rotation shaft of the actuator included in the steering apparatus and outputs a detection value thereof to steering system 122.

Steering system 122 generates a steering command to the steering apparatus in accordance with a prescribed control request outputted from ADK 200 through VCIB 111 and integrated control manager 115. Then, steering system 122 controls the steering apparatus based on the generated steering command.

Powertrain system 123 controls an electric parking brake (EPB) system provided in at least one of a plurality of wheels, a parking lock (P-Lock) system provided in a transmission of base vehicle 100, and a propulsion system including a shift apparatus for selecting a shift range. A detailed configuration of powertrain system 123 will be described later with reference to FIG. 2.

Active safety system 125 detects an obstacle (a pedestrian, a bicycle, a parked vehicle, a utility pole, or the like) in front or in the rear of the vehicle with the use of camera 129A and radar sensors 129B and 129C. Active safety system 125 determines whether or not vehicle 10 may collide with the obstacle based on a distance between vehicle 10 and the obstacle and a direction of movement of vehicle 10. Then, when active safety system 125 determines that there is possibility of collision, it outputs a braking command to brake system 121 through integrated control manager 115 so as to increase braking force of the vehicle.

Body system 126 is configured to control, for example, various devices such as a direction indicator, a headlight, a hazard light, a horn, a front wiper, and a rear wiper (none of which is shown), depending on a state or an environment of travel of vehicle 10. Body system 126 controls the various devices in accordance with a prescribed control request outputted from ADK 200 through VCIB 111 and integrated control manager 115.

VCIB 111 is configured to communicate with ADS 202 of ADK 200 over a controller area network (CAN). VCIB 111 receives various control requests from ADS 202 or outputs a status of VP 120 to ADS 202 by executing a prescribed API defined for each communicated signal. When VCIB 111 receives the control request from ADS 202, it outputs a control command corresponding to the control request to a system corresponding to the control command through integrated control manager 115. VCIB 111 obtains various types of information on base vehicle 100 from each system through integrated control manager 115 and outputs the status of base vehicle 100 as the vehicle status to ADS 202.

Vehicle 10 may be adopted as one of features of a mobility as a service (MaaS) system. The MaaS system further includes, for example, a data server and a mobility service platform (MSPF) (neither of which is shown), in addition to vehicle 10.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF. Various mobility services including mobility services can use various functions provided by the MSPF by using APIs published on the MSPF, depending on service contents.

VP 120 further includes a data communication module (DCM) (not shown) as a communication interface (UF) to wirelessly communicate with a data server of the MaaS system. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF publishes APIs for using various types of data on vehicle statuses and vehicle control necessary for development of the ADK. Various mobility services can use various functions provided by the MSPF depending on service contents, by using the APIs published on the MSPF. For example, the autonomous driving related mobility services can obtain operation control data of an autonomous driving vehicle that communicates with the data server or information stored in the data server from the MSPF by using the APIs published on the MSPF. The autonomous driving related mobility services can transmit data for managing an autonomous driving vehicle including vehicle 10 to the MSPF by using the API.

Figure 2:
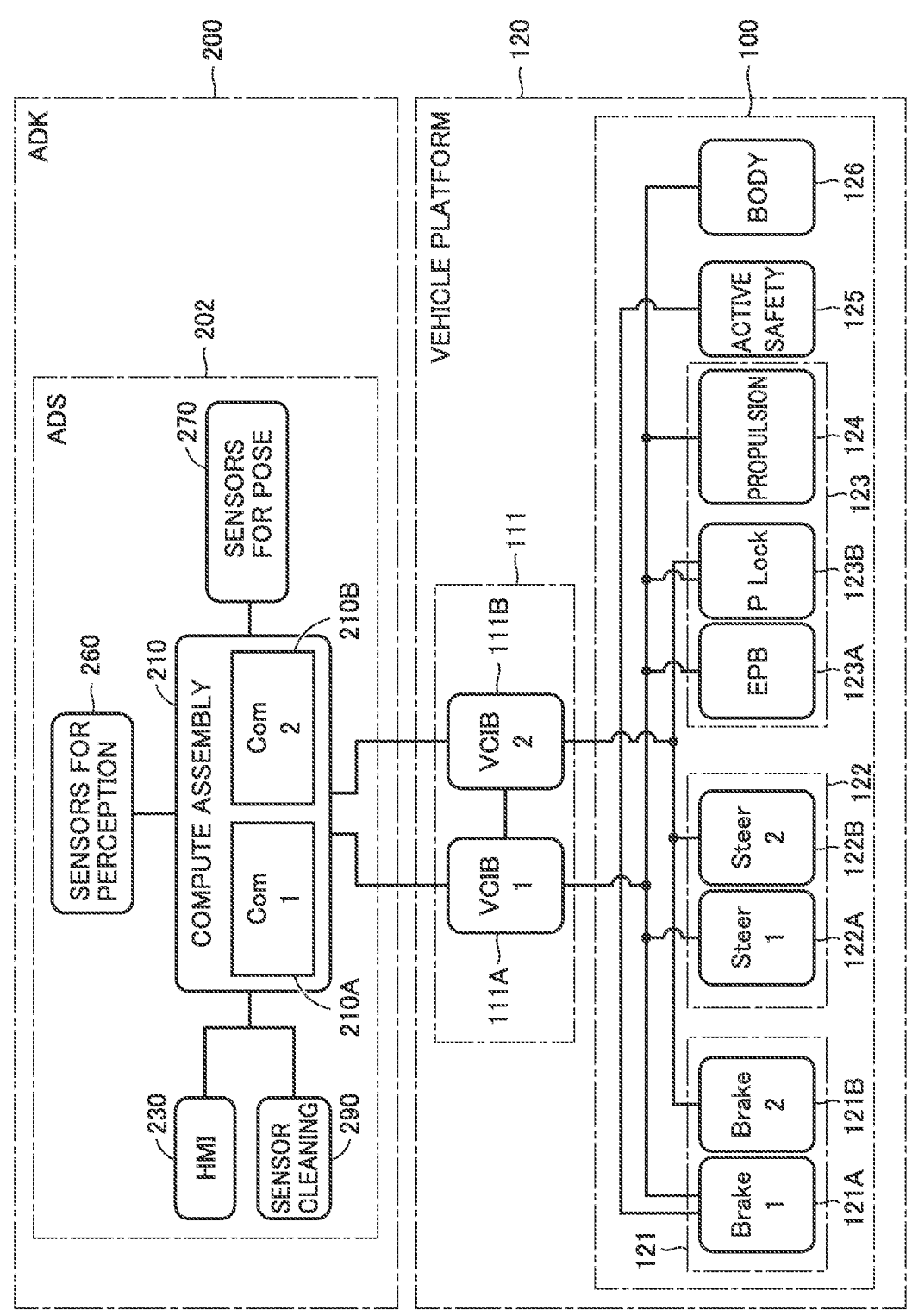
FIG. 2 is a diagram showing in further detail, a configuration of an ADK (ADS) and a VP shown in FIG. 1.

FIG. 2 is a diagram showing in further detail, a configuration of ADK 200 (ADS 202) and VP 120 shown in FIG. 1. Referring to FIG. 2, ADS 202 of ADK 200 includes a compute assembly 210, a human machine interface (HMI) 230, sensors for perception 260, sensors for pose 270, and a sensor cleaning 290.

Compute assembly 210 includes communication modules 210A and 210B. Communication modules 210A and 210B are configured to communicate with VCIB 111. During autonomous driving of vehicle 10, compute assembly 210 obtains an environment around the vehicle and a pose, a behavior, and a position of vehicle 10 from various sensors (which will be described later), and obtains a vehicle status from VP 120 through VCIB 111 and sets a next operation (acceleration, deceleration, or turning) of vehicle 10. Then, compute assembly 210 outputs various commands for realizing a set next operation to VCIB 111 in VP 120.

HMI 230 presents information to a user and accepts an operation by the user during autonomous driving, during driving requiring a user operation, or at the time of transition between autonomous driving and driving requiring an operation by the user. HMI 230 is constructed to be connected to an input and output apparatus (not shown) such as a touch panel display provided in VP 120.

Sensors for perception 260 are sensors that perceive an environment around the vehicle. Sensors for perception 260 include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 are sensors that detect a pose, a behavior, or a position of vehicle 10. Sensors for pose 270 include, for example, an inertial measurement unit (IMU) and a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIBs 111A and 111B includes an electronic control unit (ECU). The ECU includes a processor such as a not-shown central processing unit (CPU) and a memory (a read only memory (ROM) and a random access memory (RAM)). A program executable by the processor is stored in the ROM. The processor performs various types of processing in accordance with the program stored in the ROM.

VCIBs 111A and 111B are communicatively connected to communication modules 210A and 210B of ADS 202, respectively. VCIB 111A and VCIB 111B are also communicatively connected to each other. Though VCIB 111B is equivalent in function to VCIB 111A, it is partially different in a plurality of systems connected thereto that make up VP 120.

VCIBs 111A and 111B each relay control requests and vehicle statuses between ADS 202 and VP 120. More specific description will be given representatively for VCIB 111A. VCIB 111A receives various control requests outputted from ADS 202 in accordance with an API defined for each control request. Then, VCIB 111A generates a command corresponding to the received control request and outputs the command to a system of base vehicle 100 corresponding to the control request. In the present embodiment, the control request received from ADS 202 includes a trunk operation command (Trunk Operate Command) indicating activation for opening and closing of a trunk door (rear door) of base vehicle 100.

VCIB 111A receives vehicle information provided from each system of VP 120 and transmits information indicating the vehicle status of VP 120 to ADS 202 in accordance with an API defined for each vehicle status. The information indicating the vehicle status to be transmitted to ADS 202 may be information identical to the vehicle information provided from each system of VP 120 or may be information extracted from the vehicle information to be used for processing performed by ADS 202.

As VCIBs 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnecting a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 through a communication bus. VCIB 111B is communicatively connected to brake system 121B, steering system 122B, and P-Lock system 123B through a communication bus.

Brake systems 121A and 121B are configured to control a plurality of braking apparatuses provided in wheels. Brake system 121B may be equivalent in function to brake system 121A, or one of brake systems 121A and 121B may be configured to independently control braking force of each wheel during travel of the vehicle and the other thereof may be configured to control braking force such that equal braking force is generated in the wheels during travel of the vehicle.

Brake systems 121A and 121B each generate a braking command to the braking apparatus in accordance with a control request received from ADS 202 through VCIB 111. For example, brake systems 121A and 121B control the braking apparatus based on a braking command generated in one of the brake systems, and when a failure occurs in that brake system, the braking apparatus is controlled based on a braking command generated in the other brake system.

Steering systems 122A and 122B are configured to control a steering angle of a steering wheel of vehicle 10 with a steering apparatus. Steering system 122B is similar in function to steering system 122A.

Steering systems 122A and 122B each generate a steering command to the steering apparatus in accordance with a control request received from ADS 202 through VCIB 111. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB is provided separately from the braking apparatus, and fixes a wheel by an operation of an actuator. The EPB, for example, activates a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request received from ADS 202 through VCIB 111.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of base vehicle 100. Rotation of an output shaft of the transmission is thus fixed and the wheel is fixed.

P-Lock system 123B controls the P-Lock apparatus in accordance with a control request received from ADS 202 through VCIB 111. When the control request from ADS 202 includes a request to set the shift range to a parking range (P range), P-Lock system 123B activates the P-Lock apparatus, and when the control request includes a request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (N range), a forward travel range (D range), and a rearward travel range (R range). The drive source includes, for example, a motor generator and an engine.

Propulsion system 124 controls the shift apparatus and the drive source in accordance with a control request received from ADS 202 through VCIB 111.

Active safety system 125 is communicatively connected to brake system 121A. As described above, active safety system 125 detects an obstacle (an obstacle or a human) in front of the vehicle by using camera 129A and radar sensor 129B, and when it determines that there is possibility of collision based on a distance to the obstacle, it outputs a braking command to brake system 121A so as to increase braking force.

Body system 126 controls various devices in accordance with a control request (control command) received from ADS 202 through VCIB 111. The various devices include a headlight, a front wiper, and a rear wiper. Body system 126 controls the headlight, the front wiper, and the rear wiper in accordance with a control command from a combination switch 300 (FIG. 3) for manually operating the headlight, the front wiper, and the rear wiper.

For example, when an autonomous mode is selected as the autonomous state by an operation by the user onto HMI 230 in vehicle 10, autonomous driving is carried out. During autonomous driving, ADS 202 initially creates a driving plan as described above. Examples of the driving plan include a plan to continue straight travel, a plan to turn left/right at a prescribed intersection on a predetermined travel path, and a plan to change a travel lane.

ADS 202 calculates a controllable physical quantity (an acceleration, a deceleration, and a wheel steer angle) necessary for operations of vehicle 10 in accordance with the created driving plan. ADS 202 splits the physical quantity for each execution cycle time of the API. ADS 202 outputs a control request representing the split physical quantity to VCIB 111 by means of the API. Furthermore, ADS 202 obtains a vehicle status (an actual direction of movement of the vehicle and a state of fixation of the vehicle) from VP 120 and creates again the driving plan on which the obtained vehicle status is reflected. ADS 202 thus allows autonomous driving of vehicle 10.

Various devices (the headlight, the front wiper, and the rear wiper) are controlled based on a user operation onto combination switch 300 (FIG. 3) or a control command (an operation mode request) from ADK 200. VCIB 111 generates a control command based on the user operation onto combination switch 300 (FIG. 3) or the command from ADK 200 and outputs the control command to body system 126. Body system 126 has the various devices operate in accordance with the control command.

Figure 3:
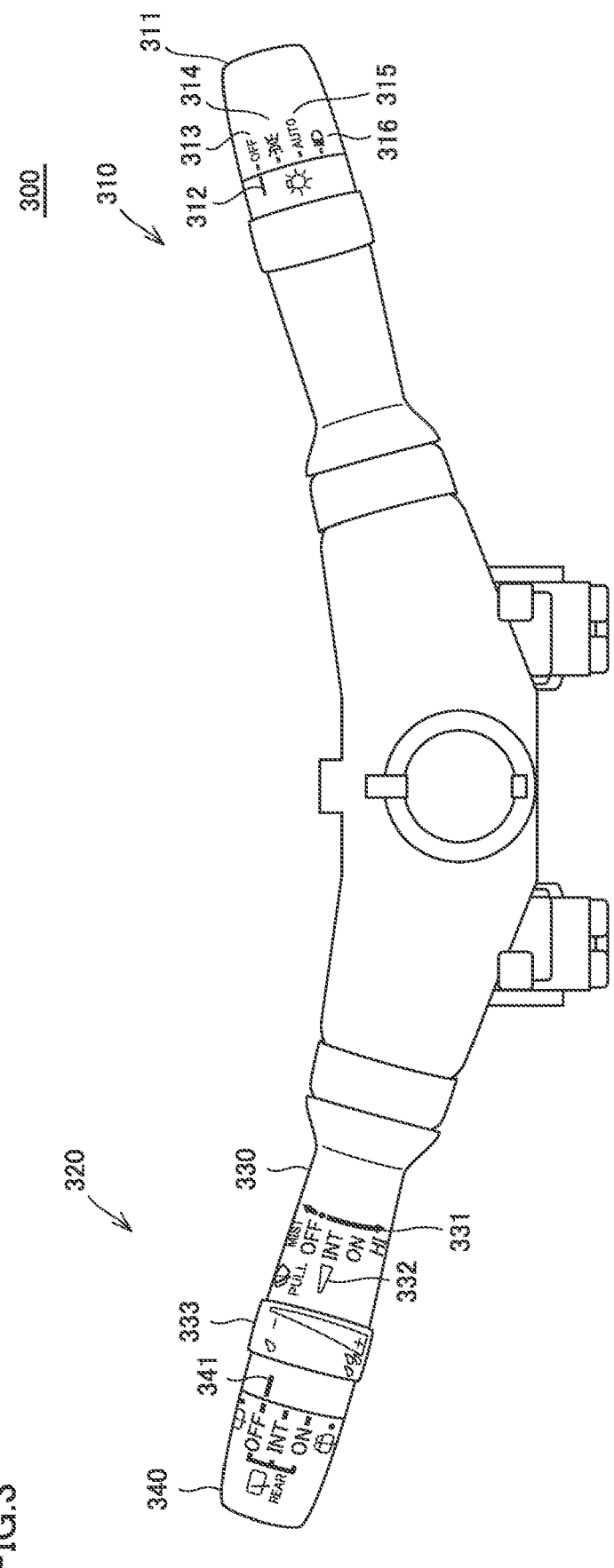
FIG. 3 is a diagram for illustrating a combination switch.

FIG. 3 is a diagram for illustrating combination switch 300.

Combination switch 300 includes a lever switch 310 for an operation of the headlight and a lever switch 320 for an operation of the front wiper and the rear wiper.

The headlight includes a "TAIL mode," a "HEAD mode," an "AUTO mode," a "HI mode," and an "OFF mode" as operation statuses (operation modes). The "TAIL mode" refers to a mode to turn on a parking light (side light). The "HEAD mode" refers to a mode to turn on the headlight and set a low beam. The "AUTO mode" refers to a mode in which VP 120 (body system 126 in the present embodiment) automatically sets the operation mode based on an illuminance around vehicle 10. The "HI mode" refers to a mode to turn on the headlight and set a high beam. The "OFF mode" refers to a mode to turn off the headlight.

The operation mode of the headlight can be set by the user who operates lever switch 310. The operation mode of the headlight set by the user by the operation onto lever switch 310 may be denoted as a "headlight setting mode." Combination switch 300 outputs a signal indicating the set headlight setting mode (which is also referred to as a "headlight driver input (Headlight_Driver_Input)" below) to VCIB 111. In other words, combination switch 300 notifies VCIB 111 of an operation input for the headlight by the driver.

Lever switch 310 includes a manipulation portion 311. The user can set the headlight setting mode to one of the "OFF mode," the "TAIL mode," the "AUTO mode," and the "HEAD mode" by operating manipulation portion 311. Manipulation portion 311 includes a mode position 313 for setting the OFF mode, a mode position 314 for setting the TAIL mode, a mode position 315 for setting the AUTO mode, and a mode position 316 for setting the HEAD mode. The user can align a desired mode position with a reference position 312 to set the headlight setting mode to a desired mode. In FIG. 3, mode position 313 is aligned with reference position 312. Manipulation portion 311 corresponds to the "second manipulation portion" according to the present embodiment.

Positions of lever switch 310 can be set in two levels. The positions in two levels include a position where an ordinary lever status is set (a low beam position) and a position where a HI lever status is set (a high beam position). When lever switch 310 is located at the low beam position, the low beam is used. When lever switch 310 is located at the high beam position, the high beam is used. For example, when lever switch 310 is located at the low beam position in FIG. 3, combination switch 300 outputs to VCIB 111, the headlight driver input indicating the OFF mode as the headlight setting mode. For example, when lever switch 310 is located at the high beam position in FIG. 3, combination switch 300 outputs to VCIB 111, the headlight driver input indicating the HI mode as the headlight setting mode. A mechanism for switching of the position of lever switch 310 corresponds to the "first manipulation portion" according to the present disclosure.

FIG. 4 is a diagram for illustrating a headlight driver input. FIG. 4 shows relation between the headlight driver input and a corresponding value. Specifically, a value is shown in the field of "Value" and the headlight driver input is shown in the field of "Description". Remarks are shown in the field of "Remarks".

Referring to FIG. 4, the value 0 indicates the "OFF mode." The value 1 indicates "TAIL mode ON." The value 2 indicates "LO mode ON," or in other words, "HEAD mode ON." The value 3 indicates "AUTO mode ON." The value 4 indicates "HI mode ON." The value 7 indicates "invalid (invalid)." Though the values 5 and 6 are not used in the present embodiment, they can also be set and used as appropriate.

When mode position 313 is aligned with reference position 312 and an off position contact signal is ON, combination switch 300 outputs "0" to VCIB 111. When mode position 314 is aligned with reference position 312 and a tail position contact signal is ON, combination switch 300 outputs "1" to VCIB 111. When mode position 316 is aligned with reference position 312 and a head position contact signal is ON, combination switch 300 outputs "2" to VCIB 111. When mode position 315 is aligned with reference position 312 and an auto position contact signal is ON, combination switch 300 outputs "3" to VCIB 111. When lever switch 310 is located at the high beam position and a HI position contact signal is ON, combination switch 300 outputs "4" to VCIB 111.

When contact signals are simultaneously ON, combination switch 300 outputs a value determined in accordance with a priority "LO>AUTO>TAIL>OFF" to VCIB 111. For example, when the auto position contact signal and the tail position contact signal are simultaneously ON, combination switch 300 outputs "3" to VCIB 111 in accordance with the priority.

When the headlight setting mode has been set to the AUTO mode, VCIB 111 accepts a light activation mode request (control request) from ADK 200. ADK 200 outputs to VCIB 111, a light operation mode request (Headlight_Mode_Command) that indicates an illumination status of the headlight every prescribed cycle. VCIB 111 that has received the light operation mode request accepts the light operation mode request when the headlight setting mode has been set to the AUTO mode.

FIG. 5 is a diagram for illustrating the light operation mode request. FIG. 5 shows relation between the light operation mode request and a corresponding value. Specifically, a value is shown in the field of "Value" and the light operation mode request is shown in the field of "Description". Remarks are shown in the field of "Remarks".

Referring to FIG. 5, the value 0 indicates "no request (No request)." The value 1 indicates a "TAIL mode request (TAIL mode request)." The value 2 indicates a "HEAD mode request (HEAD mode request)." The value 3 indicates an "AUTO mode request (AUTO mode request)." The value 4 indicates a "HI mode request (HI mode request)." The value 5 indicates an "OFF mode request (OFF mode request)." Though the values 6 and 7 are not used in the present embodiment, they can also be set and used as appropriate.

VCIB 111 according to the present embodiment has first correspondence information stored in a memory, the first correspondence information serving for determination of a headlight mode status (Headlight_Mode_Status) based on relation between the headlight driver input and the light activation mode request. The headlight mode status is a signal that gives a notification of the illumination status of the headlight. As described above, VCIB 111 accepts the light operation mode request when the headlight setting mode has been set to the AUTO mode. VCIB 111 determines the headlight mode status based on the headlight driver input, the light activation mode request, and the first correspondence information. After VCIB 111 accepts the light operation mode request, the user may also operate lever switch 310 to change the headlight setting mode to another mode. In such a case as well, VCIB 111 determines the headlight mode status based on the headlight driver input, the light activation mode request, and the first correspondence information. VCIB 111 generates a control command in accordance with the determined headlight mode status and outputs the generated control command to VP 120 (body system 126).

FIG. 6 is a diagram for illustrating first correspondence information. VCIB 111 determines the operation mode of the headlight by checking the headlight driver input and the light operation mode request against the first correspondence information.

Referring to FIG. 6, the headlight driver input (Driver input in FIG. 6) is broadly categorized depending on whether lever switch 310 is located at the low beam position (the position indicating the ordinary lever status) or the high beam position. When lever switch 310 is located at the low beam position, VCIB 111 refers to a corresponding headlight driver input in an upper tier and a corresponding light activation mode request. When lever switch 310 is located at the high beam position, VCIB 111 refers to a corresponding headlight driver input in a lower tier and a corresponding light activation mode request. Basically, VCIB 111 prioritizes the last operation mode. VCIB 111 prioritizes HI over HEAD and AUTO when one of the headlight driver input and the light operation mode request indicates HI.

When one of the headlight driver input and the light operation mode request indicates the HI mode, in other words, the headlight driver input indicates the HI mode (lever switch 310 is located at the high beam position) or the light operation mode request indicates the HI mode, VCIB 111 prioritizes the HI mode over the HEAD mode and the AUTO mode. Specifically, referring to FIG. 6, when the headlight driver input indicates the HI mode (lever switch 310 is located at the high beam position and mode position 315 has been set at reference position 312) and the light operation mode request indicates the HEAD mode or the AUTO mode, VCIB 111 determines the HI mode as the headlight mode status in accordance with the first correspondence information. When the headlight driver input indicates the HEAD mode or the AUTO mode (lever switch 310 is located at the low beam position and mode position 315 or mode position 316 has been set at reference position 312) and the light operation mode request indicates the HI mode, VCIB 111 determines the HI mode as the headlight mode status in accordance with the first correspondence information. VCIB 111 outputs to VP 120, the control command for setting the headlight mode status to HI.

When the accepted light operation mode request indicates the OFF mode or the TAIL mode, VCIB 111 determines Latest as the headlight mode status. Latest means a last (immediately preceding) headlight mode status. VCIB 111 outputs to VP 120, the control command for setting the determined headlight mode status.

When VCIB 111 accepts the light operation mode request indicating the OFF mode or the TAIL mode and when the user operates lever switch 310 to switch the headlight setting mode from the AUTO mode to the OFF mode, the TAIL mode, or the HEAD mode, it determines Latest as the headlight mode status. VCIB 111 outputs to VP 120, the control command to set the determined headlight mode status.

When the accepted light operation mode request indicates the HEAD mode or the AUTO mode while the headlight driver input indicates the AUTO mode (lever switch 310 is located at the low beam position and mode position 315 has been set at reference position 312), VCIB 111 determines Latest as the headlight mode status. When the accepted light operation mode request indicates the HEAD mode or the AUTO mode while the headlight driver input indicates the HI mode (lever switch 310 is located at the high beam position and mode position 315 has been set at reference position 312), VCIB 111 determines the HI mode as the headlight mode status. VCIB 111 outputs to VP 120, the control command for setting the determined headlight mode status.

FIG. 7 is a flowchart showing a procedure of processing for determining the headlight mode status. The processing in the flowchart in FIG. 7 is invoked from a main routine every prescribed control cycle and performed by VCIB 111. Though processing in flowcharts in FIG. 7 and FIGS. 11 and 15 which will be described later is described as being implemented by software processing by VCIB 111, a part or the entirety thereof may be implemented by hardware (electric circuitry) made in VCIB 111.

In S1, VCIB 111 determines whether or not the headlight driver input indicates the AUTO mode. When the headlight driver input indicates the AUTO mode (YES in S1), VCIB 111 has the process proceed to S2. When the headlight driver input does not indicate AUTO mode ON (NO in S1), VCIB 111 has the process proceed to S5.

In S2, VCIB 111 determines to accept the light operation mode request from ADK 200.

In S3, VCIB 111 identifies the current headlight driver input. When the user has operated lever switch 310 to align a mode position other than mode position 315 with reference position 312 (the mode position aligned with reference position 312 in S1 or later has been changed from mode position 315) at this time point, the headlight driver input in accordance with the mode position is identified as the current headlight driver input.

In S4, VCIB 111 reads the first correspondence information. VCIB 111 checks the current headlight driver input identified in S3 and the light operation mode request accepted in S2 against the first correspondence information to determine the illumination status of the headlight (the headlight mode status). VCIB 111 then has the process proceed to S6.

In S5, VCIB 111 determines not to accept the light operation mode request from ADK 200.

In S6, VCIB 111 generates the control command. When processing from S2 to S4 is performed, VCIB 111 generates the control command to achieve the headlight mode status determined in S4. When processing in S5 is performed, VCIB 111 generates the control command in accordance with the headlight driver input.

In S7, VCIB 111 outputs the control command generated in S6 to VP 120 (body system 126).

Referring again to FIG. 3, lever switch 320 includes a manipulation portion 330 for the front wiper and a manipulation portion 340 for the rear wiper.

The front wiper includes an "OFF mode," a "LO mode," a "HI mode," an "intermittent operation mode," an "AUTO mode," and a "MIST mode" as operation modes. The "OFF mode" refers to a mode to stop the front wiper. The "LO mode" refers to a mode to operate the front wiper at a first speed. The "HI mode" refers to a mode to operate the front wiper at a second speed higher than the first speed. The "intermittent operation mode" refers to a mode to intermittently operate the front wiper. In the intermittent operation mode, an interval between operations of the front wiper is set based on a position of manipulation portion 333 with respect to a setting position 332. The "AUTO mode" refers to a mode in which VP 120 automatically makes selection between the LO mode and the HI mode based on a result of detection by a raindrop sensor provided on a windshield. Without sensing by the raindrop sensor, the front wiper is not activated in the AUTO mode. The "MIST mode" refers to a mode in which the front wiper is activated only a prescribed number of times (for example, once).

The operation mode of the front wiper can be set by the user by an operation onto manipulation portion 330 of lever switch 320. The operation mode of the front wiper set by the user who operates manipulation portion 330 may be denoted as a "front wiper setting mode." Combination switch 300 outputs a signal indicating the set front wiper setting mode (which is also referred to as a "front wiper driver input (Windshieldwiper_Front_Driver_Input)" below) to VCIB 111. In other words, an operation input by a driver for the front wiper is given from combination switch 300 to VCIB 111.

The user can set the front wiper setting mode to one of the "OFF mode," the "LO mode," the "HI mode," the "intermittent operation mode," the "AUTO mode," and the "MIST mode" by operating manipulation portion 330. Manipulation portion 330 includes a mode position for setting of the OFF mode, a mode position for setting of the LO mode, a mode position for setting of the HI mode, a mode position for setting of the intermittent operation mode, a mode position for setting of the AUTO mode, and a mode position for setting of the MIST mode. "ON" in manipulation portion 330 in FIG. 3 indicates the mode position for setting of the LO mode. The user can set the front wiper setting mode to a desired mode, for example, by turning manipulation portion 330 in a direction shown with an arrow 331. In FIG. 3, the front wiper setting mode is set to the OFF mode.

FIG. 8 is a diagram for illustrating a front wiper driver input. FIG. 8 shows relation between the front wiper driver input and a corresponding value. Specifically, a value is shown in the field of "Value" and the front wiper driver input is shown in the field of "Description". Remarks are shown in the field of "Remarks".

Referring to FIG. 8, the value 0 indicates an "OFF mode position (OFF position)." The value 1 indicates a "LO mode position (LO mode position)." The value 2 indicates a "HI mode position (HI mode position)." The value 3 indicates an "intermittent operation mode position (Intermittent mode position)." The value 4 indicates an "AUTO mode position (AUTO mode position)." The value 5 indicates a "MIST mode (one time wiping) position (MIST mode (one time wiping) position)." The value "7" indicates "invalid (invalid)." Though the value 6 is not used in the present embodiment, it can also be set and used as appropriate.

When an off position contact signal is ON, combination switch 300 outputs "0" to VCIB 111. When a LO position contact signal is ON, combination switch 300 outputs "1" to VCIB 111. When a HI position contact signal is ON, combination switch 300 outputs "2" to VCIB 111. When an INT position contact signal (Intermittent) is ON, combination switch 300 outputs "3" to VCIB 111. When an AUTO position contact signal is ON, combination switch 300 outputs "4" to VCIB 111. When a MIST position contact signal is ON, combination switch 300 outputs "5" to VCIB 111.

When contact signals are simultaneously ON, combination switch 300 outputs a value determined in accordance with a priority "HI>AUTO>LO>MIST>OFF" to VCIB 111. For example, when the HI position contact signal and the OFF position contact signal are simultaneously ON, combination switch 300 outputs "2" to VCIB 111 in accordance with the priority. When all contacts are open, combination switch 300 outputs 0.

VCIB 111 receives a front wiper operation mode request (Windshieldwiper_Mode_Front_Command) from ADK 200. ADK 200 outputs the front wiper operation mode request indicating the operation mode of the front wiper to VCIB 111 every prescribed cycle.

FIG. 9 is a diagram for illustrating a front wiper operation mode request. FIG. 9 shows relation between the front wiper operation mode request and a corresponding value. Specifically, a value is shown in the field of "Value" and a front wiper operation mode request is shown in the field of "Description". Remarks are shown in the field of "Remarks".

Referring to FIG. 9, the value 0 indicates a "stop request (OFF mode request)." The value 1 indicates a "LO mode request (LO mode request)." The value 2 indicates a "HI mode request (HI mode request)." The value 3 indicates an "intermittent operation mode request (Intermittent mode request)." The value 4 indicates an "AUTO mode request (AUTO mode request)." The value 5 indicates a "MIST mode request (MIST mode request)." Though the values 6 and 7 are not used in the present embodiment, they can also be set and used as appropriate.

When the front wiper driver input and the front wiper operation mode request are requests different from each other, VCIB 111 generates the control command in accordance with the request to cause the front wiper to more actively operate and outputs the generated control command to VP 120 (body system 126). VCIB 111 has second correspondence information stored in a memory, the second correspondence information serving for determination of a front wiper status (Windshieldwiper_Mode_Front_Status) based on relation between the front wiper driver input and the front wiper operation mode request. The front wiper status is a signal that gives a notification of an operation status of the front wiper.

FIG. 10 is a diagram for illustrating second correspondence information. VCIB 111 determines the operation mode of the front wiper by checking the front wiper driver input and the front wiper operation mode request against the second correspondence information.

When the front wiper driver input and the front wiper operation mode request are requests different from each other, VCIB 111 reads the second correspondence information from the memory and checks the front wiper driver input and the front wiper operation mode request against the second correspondence information. When one of the front wiper driver input and the front wiper operation mode request indicates the HI mode, VCIB 111 outputs to VP 120, the control command for setting the front wiper status to HI.

For example, when the front wiper driver input has the value 2 (HI mode position) and the front wiper operation mode request has the value 1 (LO mode request), VCIB 111 outputs to VP 120, the control command for setting the front wiper status to HI. For example, when the front wiper driver input has the value 5 (the MIST mode position) and the front wiper operation mode request has the value 1 (the LO mode request), VCIB 111 outputs to VP 120, the control command for setting the front wiper status to LO. Alternatively, for example, when the front wiper driver input has the value 3 (intermittent operation mode position) or the value 5 (MIST mode position) and the front wiper operation mode request has the value 3 (intermittent operation mode request) or the value 5 (MIST mode request), VCIB 111 outputs to VP 120, the control command to set the front wiper status to LO.

FIG. 11 is a flowchart showing a procedure of processing for determining the front wiper status. The processing in the flowchart in FIG. 11 is invoked from a main routine every prescribed control cycle and performed by VCIB 111.

In S10, VCIB 111 determines whether or not it has received the front wiper driver input (a front wiper control request) from combination switch 300 and the front wiper operation mode request from ADK 200. When the VCIB has received the front wiper driver input and the front wiper operation mode request (YES in S10), VCIB 111 has the process proceed to S11. When the VCIB has received any one of the front wiper driver input and the front wiper operation mode request (NO in S10), VCIB 111 skips the processing in S11 and has the process proceed to S12.

In S11, VCIB 111 reads the second correspondence information. VCIB 111 checks the front wiper driver input and the front wiper operation mode request against the second correspondence information to determine the operation status of the front wiper (front wiper status).

In S12, VCIB 111 generates the control command. When VCIB 111 performs the processing in S11, VCIB 111 generates the control command to achieve the front wiper status determined in S11. When VCIB 111 skips the processing in S11, it generates the control command in accordance with the request it received, of the front wiper driver input and the front wiper operation mode request.

In S13, VCIB 111 outputs the control command generated in S12 to VP 120 (body system 126).

The rear wiper includes an "OFF mode," a "LO mode," and an "intermittent operation mode" as operation modes. The "OFF mode" refers to a mode to stop the rear wiper. The "LO mode" refers to a mode to operate the rear wiper at a prescribed speed. The "intermittent operation mode" refers to a mode to intermittently operate the rear wiper. An interval between operations in the intermittent operation mode of the rear wiper in the present embodiment is fixed to a prescribed interval. The rear wiper may also be configured such that the operation interval thereof can be set, similarly to the front wiper described above.

The operation mode of the rear wiper can be set by the user who operates manipulation portion 340 of lever switch 320. The operation mode of the rear wiper set by the user by the operation onto manipulation portion 340 may be denoted as a "rear wiper setting mode." Combination switch 300 outputs a signal indicating the set rear wiper setting mode (which is also referred to as a "rear wiper driver input (Windshieldwiper_Rear_Driver_Input)" below) to VCIB 111. In other words, combination switch 300 notifies VCIB 111 of the operation input by the driver for the rear wiper.

The user can set the rear wiper setting mode to one of the "OFF mode," the "LO mode," and the "intermittent operation mode" by operating manipulation portion 340. Manipulation portion 340 includes an OFF mode position for setting of the OFF mode, a LO mode position for setting of the LO mode, and an intermittent operation mode position for setting of the intermittent operation mode. The user can set the rear wiper operation mode to a desired mode by aligning a desired mode position with a reference position 341. In FIG. 3, the rear wiper setting mode is set to the OFF mode. "ON" in manipulation portion 340 in FIG. 3 indicates the mode position for setting of the LO mode.

FIG. 12 is a diagram for illustrating a rear wiper driver input. FIG. 12 shows relation between the rear wiper driver input and a corresponding value. Specifically, a value is shown in the field of "Value" and a rear wiper driver input is shown in the field of "Description". Remarks are shown in the field of "Remarks".

Referring to FIG. 12, the value 0 indicates an "OFF mode position (OFF position)." The value 1 indicates a "LO mode position (Lo mode position)." The value 3 indicates an "intermittent operation mode position (Intermittent mode position)." The value 7 indicates "invalid (invalid)." Though the values 2 and 4 to 6 are not used in the present embodiment, they can be set and used as appropriate.

When an ON position contact signal (LO position contact signal) is ON, combination switch 300 outputs "1" to VCIB 111. When an INT position contact signal (Intermittent) is ON, combination switch 300 outputs "3" to VCIB 111. When both of the ON position contact signal and the INT position contact signal are OFF, combination switch 300 outputs "0" to VCIB 111.

When contact signals are simultaneously ON, combination switch 300 outputs a value determined in accordance with a priority "RrON>Rrin>OFF" to VCIB 111. RrON means an ON position contact signal and Rrin means an INT position contact signal. For example, when the ON position contact signal and the INT position contact signal are simultaneously ON, combination switch 300 outputs "1" to VCIB 111 in accordance with the priority.

VCIB 111 receives a rear wiper operation mode request (Windshieldwiper_Mode_Rear_Command) from ADK 200. ADK 200 outputs the rear wiper operation mode request indicating the operation mode of the rear wiper to VCIB 111 every prescribed cycle.

FIG. 13 is a diagram for illustrating a rear wiper operation mode request. FIG. 13 shows relation between the rear wiper operation mode request and a corresponding value. Specifically, a value is shown in the field of "Value" and a rear wiper operation mode request is shown in the field of "Description". Remarks are shown in the field of "Remarks".

Referring to FIG. 13, the value 0 indicates a stop request (OFF mode request)." The value 1 indicates a "LO mode request (LO mode request)." The value 3 indicates an "intermittent operation mode request (Intermittent mode request)." Though the values 2 and 4 to 7 are not used in the present embodiment, they can be set and used as appropriate.

When the rear wiper driver input and the rear wiper operation mode request are requests different from each other, VCIB 111 generates the control command in accordance with the request to cause the rear wiper to more actively operate, and outputs the generated control command to VP 120 (body system 126). VCIB 111 has third correspondence information stored in a memory, the third correspondence information serving for determination of a rear wiper status (Windshieldwiper_Mode_Rear_Status) depending on relation between the rear wiper driver input and the rear wiper operation mode request. The rear wiper status is a signal that gives a notification of an operation status of the rear wiper.

FIG. 14 is a diagram for illustrating the third correspondence information. VCIB 111 determines the operation mode of the rear wiper by checking the rear wiper driver input and the rear wiper operation mode request against the third correspondence information.

When the rear wiper driver input and the rear wiper operation mode request are requests different from each other, VCIB 111 reads the third correspondence information from the memory and checks the rear wiper driver input and the rear wiper operation mode request against the third correspondence information. For example, when the rear wiper driver input has the value 1 (LO mode position) and the rear wiper operation mode request has the value 0 (OFF mode request), VCIB 111 outputs to VP 120, the control command for setting the rear wiper status to LO. For example, when the rear wiper driver input has the value 3 (intermittent operation mode position) and the rear wiper operation mode request has the value 1 (LO mode request), VCIB 111 outputs to VP 120, the control command for setting the rear wiper status to LO.

FIG. 15 is a flowchart showing a procedure of processing for determining a rear wiper status. The processing in the flowchart in FIG. 15 is invoked from a main routine every prescribed control cycle and performed by VCIB 111.

In S20, VCIB 111 determines whether or not it has received the rear wiper driver input (a rear wiper control request) from combination switch 300 and the rear wiper operation mode request from ADK 200. When the VCIB has received the rear wiper driver input and the rear wiper operation mode request (YES in S20), VCIB 111 has the process proceed to S21. When the VCIB has received any one of the rear wiper driver input and the rear wiper operation mode request (NO in S20), VCIB 111 has the processing in S21 skipped and has the process proceed to S22.

In S21, VCIB 111 reads the third correspondence information. VCIB 111 checks the rear wiper driver input and the rear wiper operation mode request against the third correspondence information to determine the operation status of the rear wiper (rear wiper status).

In S22, VCIB 111 generates the control command. When the VCIB performs the processing in S21, VCIB 111 generates the control command to achieve the rear wiper status determined in S21. When the VCIB has the processing in S21 skipped, VCIB 111 generates the control command in accordance with the request it received, of the rear wiper driver input and the rear wiper operation mode request.

In S23, VCIB 111 outputs the control command generated in S22 to VP 120 (body system 126).

As set forth above, in vehicle 10 according to the present embodiment, when VCIB 111 receives the headlight driver input and the light operation mode request, it checks the requests against the first correspondence information to determine the headlight mode status. When the headlight driver input and the light operation mode request are requests different from each other, VCIB 111 basically prioritizes the latest (request) by following the first correspondence information. VCIB 111 outputs to VP 120, the control command in accordance with the determined headlight mode status. By setting the first correspondence information in advance and determining the headlight mode status in accordance with the first correspondence information, the headlight can operate in an optimal manner when determination by ADK 200 as to the operation of the headlight is different from determination by the user.

In vehicle 10 according to the present embodiment, when VCIB 111 receives the front wiper driver input and the front wiper operation mode request, it checks the requests against the second correspondence information to determine the front wiper mode status. When the front wiper driver input and the front wiper operation mode request are requests different from each other, VCIB 111 generates the control command in accordance with the request to cause the front wiper to more actively operate by following the second correspondence information. By setting the second correspondence information in advance and determining the front wiper status in accordance with the second correspondence information, the front wiper can operate in an optimal manner when determination by ADK 200 as to the operation of the front wiper is different from determination by the user.

In vehicle 10 according to the present embodiment, when VCIB 111 receives the rear wiper driver input and the rear wiper operation mode request, it checks the requests against the third correspondence information to determine the rear wiper mode status. When the rear wiper driver input and the rear wiper operation mode request are requests different from each other, VCIB 111 generates the control command in accordance with the request to cause the rear wiper to more actively operate by following the third correspondence information. By setting the third correspondence information in advance and determining the rear wiper status in accordance with the third correspondence information, the rear wiper can operate in an optimal manner when determination by ADK 200 as to the operation of the rear wiper is different from determination by the user.

[Modification]

In the embodiment, an example in which, when determination by ADK 200 as to various devices is different from determination by the user, VCIB 111 generates the control command for operation of various devices in accordance with correspondence information (first correspondence information to third correspondence information) for the various devices is described. What performs the processing, however, is not limited to VCIB 111, and a configuration in which VP 120 performs the processing can also be adopted. The modification can also achieve an effect as in the embodiment.

Example

API Specification for TOYOTA Vehicle Platform

Ver. 1.1

Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
　　1.1. Purpose of this Specification
　　1.2. Target Vehicle
　　1.3. Definition of Term
2. Structure
　　2.1. Overall Structure of Autono-MaaS Vehicle
　　2.2. System Structure of Autono-MaaS Vehicle
3. Application Interfaces
　　3.1. Typical Usage of APIs
　　3.2. APIs for Vehicle Motion Control
　　　　3.2.1. API List for Vehicle Motion Control
　　　　3.2.2. Details of Each API for Vehicle Motion Control
　　3.3. APIs for BODY Control
　　　　3.3.1. API List for BODY Control
　　　　3.3.2. Details of Each API for BODY Control
　　3.4. APIs for Power Control
　　　　3.4.1. API List for Power Control
　　　　3.4.2. Details of Each API for Power Control
　　3.5. APIs for Failure Notification
　　　　3.5.1. API List for Failure Notification
　　　　3.5.2. Details of Each API for Failure Notification
　　3.6. APIs for Security
　　　　3.6.1. API List for Security
　　　　3.6.2. Details of Each API for Security
4. API Guides to Control Toyota Vehicles
　　4.1. APIs for Vehicle Motion Control
　　　　4.1.1. API List for Vehicle Motion Control
　　　　4.1.2. API Guides in Details for Vehicle Motion Control
　　4.2. APIs for BODY Control
　　　　4.2.1. API List for BODY Control
　　4.3. APIs for Power Control
　　　　4.3.1. API List for Power Control
　　4.4. APIs for Failure Notification
　　　　4.4.1. API List for Failure Notification
　　4.5. APIs for Security
　　　　4.5.1. API List for Security
　　　　4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

| Definition of Term | |
|---|---|
| Term | Definition |
| ADS | Autonomous Driving System |
| ADK | Autonomous Driving Kit |
| VP | Vehicle Platform |
| VCIB | Vehicle Control Interface Box. |
| | This is an ECU for the interface and the signal |
| | converter between ADS and VP's sub systems. |
| PCS | Pre-Collision Safety |

2. Structure
2.1. Overall Structure of Autono-MaaS Vehicle
    The overall structure of Autono-MaaS is shown (FIG. 16).
2.2. System Structure of Autono-MaaS Vehicle
    System Architecture is shown in FIG. 17.
3. Application Interfaces
3.1. Typical Usage of APIs
    In this section, Typical Usage of APIs is described.
    A typical workflow of APIs is as follows (FIG. 18). The following example assumes CAN for physical communication.
3.2. APIs for Vehicle Motion Control
    In this section, the APIs for vehicle motion control are described.

3.2.1. API List for Vehicle Motion Control
3.2.1.1. Inputs

TABLE 3

| Input APIs for vehicle motion control | | |
|---|---|---|
| Signal Name | Description | Redundancy |
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

| Output APIs for vehicle motion control | | |
|---|---|---|
| Signal Name | Description | Redundancy |
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (Intervention) | N/A |
| Intervention of steering wheel | This signal shows whether the steering wheel is turned by a driver (intervention) | N/A |
| Intervention of shift lever | This signal shows whether the shift lever is controlled by a driver (Intervention) | N/A |
| Wheel speed pulse (front left) | Pulse from wheel speed sensor (Front Left Wheel) | N/A |
| Wheel rotation direction (front left) | Rotation direction of wheel (Front Lett) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |

TABLE 4-continued

| Output APIs for vehicle motion control | | |
|---|---|---|
| Signal Name | Description | Redundancy |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control 3.2.2.1. Propulsion Direction Command Request for shift change from/to forward (D range) to/from back (R range)

Values

| Value | Description | Remarks |
|---|---|---|
| 0 | No Request | |
| 2 | R | Shift to R range |
| 4 | D | Shift to D range |
| other | Reserved | |

Remarks

Available only when Vehicle mode state="Autonomous Mode."

Available only when a vehicle is stationary (Traveling direction="standstill").

Available only when brake is applied.

3.2.2.2. Immobilization Command

Request for turning on/off WheelLock

Values

The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.

Available only when Vehicle mode state="Autonomous Mode."

Changeable only when the vehicle is stationary (Traveling direction="standstill").

Changeable only while brake is applied.

3.2.2.3. Standstill Command

Request for applying/releasing brake holding function

Values

| Value | Description | Remarks |
|---|---|---|
| 0 | No Request | |
| 1 | Applied | Brake holding function is allowed. |
| 2 | Released | |

Remarks

This API is used for choosing a status of whether the brake holding function is allowed.

Available only when Vehicle mode state="Autonomous Mode."

Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks

Available only when Vehicle mode state="Autonomous Mode."

Acceleration (+) and deceleration (—) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

Values

| Value | Description | Remarks |
|---|---|---|
| — | [unit: rad] | |

Remarks

Available only when Vehicle mode state="Autonomous Mode"

Left is positive value (+). Right is negative value (−).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks

N/A

3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks

N/A

3.2.2.8. Propulsion Direction Status

Current shift Status

Values

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each immobilization system status

Values

The following table shows a case where EPB and Shift P are used for immobilization.

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A

3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks

N/A

3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front Wheel Steer Angle Rate

Values

| Value | Description | Remarks |
|---|---|---|
| Minimum Value others | Invalid value [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The limit of the Front wheel steer angle rate

Values

[unit: rad/s]

Remarks

The limitation is calculated from the "vehicle speed–steering angle rate" map as shown in following Table 5 and FIG. 19.

A) At a low speed or stopped situation, use fixed value (0.751 [rad/s]).

B) At a higher speed, the steering angle rate is calculated from the vehicle speed using 3.432 m/s$^3$.

TABLE 5

| "vehicle speed - steering angle rate" map | | | | | |
|---|---|---|---|---|---|
| Velocity [km/h] | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated Maximum Lateral Acceleration

Values

[unit: m/s$^2$] (fixed value: 3.432)

Remarks

Maximum lateral acceleration defined for VP.

3.2.2.18. Estimated Maximum Lateral Acceleration Rate

Values

[unit: m/s$^3$] (fixed value: 3.432)

Remarks

Maximum lateral acceleration rate defined for VP.

3.2.2.19. Intervention of Accelerator Pedal

This signal shows whether the accelerator pedal is depressed by a driver (intervention).

| Value | Description | Remarks |
|---|---|---|
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

Values

| Value | Description | Remarks |
|---|---|---|
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

Values

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of shift lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A 3.2.2.23. Wheel Speed Pulse (Front Left), Wheel Speed Pulse (Front Right), Wheel Speed Pulse (Rear Left), Wheel Speed Pulse (Rear Right)

Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0×FF". When "1" is added to a pulse value which shows "0×FF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

Values

| Value | Description | Remarks |
| --- | --- | --- |
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving direction of Vehicle

Values

| Value | Description | Remarks |
| --- | --- | --- |
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated longitudinal velocity of vehicle

Values

| Value | Description | Remarks |
| --- | --- | --- |
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration

Estimated longitudinal acceleration of vehicle

Values

| Value | Description | Remarks |
| --- | --- | --- |
| Minimum Value in transmission bits | Invalid value | The sensor is invalid. |
| others | Acceleration [unit: m/s$^2$] | |

Remarks

Acceleration (+) and deceleration (−) value based on Propulsion Direction Status direction.

3.2.2.28. Lateral Acceleration

Lateral acceleration of vehicle

Values

| Value | Description | Remarks |
| --- | --- | --- |
| Minimum Value in transmission bits | Invalid value | The sensor is invalid. |
| others | Acceleration [unit: m/s$^2$] | |

Remarks

A positive value shows counterclockwise. A negative value shows clockwise.

3.2.2.29. Yaw Rate

Sensor Value of Yaw Rate

Values

| Value | Description | Remarks |
| --- | --- | --- |
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of Tire Glide/Spin/Skid

Values

| Value | Description | Remarks |
| --- | --- | --- |
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle Mode State
   Autonomous or manual mode
Values

| Value | Description | Remarks |
|---|---|---|
| 0 | Manual Mode | The mode starts from Manual mode. |
| 1 | Autonomous Mode | |

Remarks
   The initial state is set to "Manual Mode."
3.2.2.32. Readiness for Autonomization
   This signal shows whether a vehicle can change to Autonomous Mode or not
Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks
   N/A
3.2.2.33. Failure Status of VP Functions for Autonomous Mode
   This signal is used to show whether VP functions have some failures mode when a vehicle works as Autonomous Mode.
Values

| Value | Description | Remarks |
|---|---|---|
| 0 | No fault | |
| 1 | Fault | |
| 3 | Invalid | The status is not determined yet. |

Remarks
   N/A
3.2.2.34. PCS Alert Status
Values

| Value | Description | Remarks |
|---|---|---|
| 0 | Normal | |
| 1 | Alert | Request alert from PCS system |
| 3 | Unavailable | |

Remarks
   N/A
3.2.2.35. PCS Preparation Status
   Prefill Status as the preparation of PCS Brake
Values

| Value | Description | Remarks |
|---|---|---|
| 0 | Normal | |
| 1 | Active | |
| 3 | Unavailable | |

Remarks
   "Active" is a status in which PCS prepares brake actuator to shorten the latency from a deceleration request issued by PCS.
   When a value turns to "Active" during Vehicle mode state="Autonomous Mode," "ADS/PCS arbitration status" shows "ADS".
3.2.2.36. PCS Brake/PCS Brake Hold Status
Values

| Value | Description | Remarks |
|---|---|---|
| 0 | Normal | |
| 1 | PCS Brake | |
| 2 | PCS Brake Hold | |
| 7 | Unavailable | |

Remarks
   N/A
3.2.2.37. ADS/PCS arbitration status
   Arbitration status
Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks
   When acceleration requested by PCS system in VP is smaller than one requested by ADS, the status is set as "PCS".
   When acceleration requested by PCS system in VP is larger than one requested by ADS, the status is set as "ADS".
3.3. APIs for BODY Control
3.3.1. API List for BODY Control
3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |

TABLE 6-continued

| Input APIs for BODY Control | | |
| --- | --- | --- |
| Signal Name | Description | Redundancy |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

| Output APIs for BODY Control | | |
| --- | --- | --- |
| Signal Name | Description | Redundancy |
| Turnsignal status | Status of the current turnsignallight mode of the vehicle platform | N/A |
| Headlight status | Status of the current headlight mode of the vehicle platform | N/A |
| Hazard light status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |

TABLE 7-continued

| Output APIs for BODY Control | | |
|---|---|---|
| Signal Name | Description | Redundancy |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control 3.3.2.1. Turnsignal command

Request to control turn-signal

Values

| Value | Description | Remarks |
|---|---|---|
| 0 | OFF | |
| 1 | Right | Right blinker ON |
| 2 | Left | Left blinker ON |
| 3 | Reserved | |

Remarks

N/A 3.3.2.2. Headlight Command

Request to control headlight

Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."
Driver operation overrides this command.

3.3.2.3. Hazardlight command

Request to control hazardlight

Values

| Value | Description | Remarks |
|---|---|---|
| 0 | No Request | |
| 1 | ON | |

Remarks

Driver operation overrides this command.
Hazardlight is ON while receiving "ON" command.

3.3.2.4. Horn Pattern Command

Request to choose a pattern of ON-time and OFF-time per cycle

Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |

-continued

| Value | Description | Remarks |
|---|---|---|
| 4 | Pattern 4 | Reserved |
| 5 | Pattern 5 | Reserved |
| 6 | Pattern 6 | Reserved |
| 7 | Pattern 7 | Reserved |

Remarks

N/A 3.3.2.5. Horn Cycle Command

Request to choose the number of ON and OFF Cycles

Values 0 to 7 [−]

Remarks

N/A 3.3.2.6. Continuous Horn Command

Request to Turn on/Off Horn

Values

| Value | Description | Remarks |
|---|---|---|
| 0 | No request | |
| 1 | ON | |

Remarks

This command's priority is higher than 3.3.2.4 Horn pattern and 3.3.2.5 Horn cycle command.

Horn is "ON" while receiving "ON" command.

3.3.2.7. Front Windshield Wiper Command

Request to Control Front Windshield Wiper

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks

This command is valid when front windshield wiper mode on a combination switch is "OFF" or "AUTO".

Driver input overrides this command.

Windshieldwiper mode is kept while receiving a command.

Wiping speed of intermittent mode is fixed.

3.3.2.8. Rear Windshield Wiper Command
Request to Control Rear Windshield Wiper
Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks
Driver input overrides this command
Windshieldwiper mode is kept while receiving a command.
Wiping speed of intermittent mode is fixed.

3.3.2.9. HVAC (1st Row) Operation Command
Request to start/stop 1st row air conditioning control
Values

| Value | Description | Remarks |
|---|---|---|
| 0 | No request | |
| 1 | ON | |
| 2 | OFF | |

Remarks
N/A

3.3.2.10. HVAC (2nd Row) Operation Command
Request to start/stop 2nd row air conditioning control
Values

| Value | Description | Remarks |
|---|---|---|
| 0 | No request | |
| 1 | ON | |
| 2 | OFF | |

Remarks
N/A

3.3.2.11. Target Temperature (1st Left) Command
Request to set target temperature in front left area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.12. Target Temperature (1st Right) Command
Request to set target temperature in front right area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.13. Target Temperature (2nd Left) Command
Request to set target temperature in rear left area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.14. Target Temperature (2nd Right) Command
Request to set target temperature in rear right area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.15. HVAC Fan (1st Row) Command
Request to set fan level of front AC
Values

| Value | Description | Remarks |
|---|---|---|
| 0 | No request | |
| 1 to 7 (Maximum) | Fan level | |

Remarks
If you would like to turn the fan level to 0 (OFF), you should transmit "HVAC (1st row) operation command=OFF."
If you would like to turn the fan level to AUTO, you should transmit "HVAC (1st row) operation command=ON."

3.3.2.16. HVAC Fan (2nd Row) Command
Request to set fan level of rear AC

| Value | Description | Remarks |
|---|---|---|
| 0 | No request | |
| 1 to 7 (Maximum) | Fan level | |

Remarks
If you would like to turn the fan level to 0 (OFF), you should transmit "HVAC (2nd row) operation command=OFF."
If you would like to turn the fan level to AUTO, you should transmit "HVAC (2nd row) operation command=ON."

3.3.2.17. Air Outlet (1st Row) Command
Request to set 1st row air outlet mode
Values

| Value | Description | Remarks |
|---|---|---|
| 0 | No Operation | |
| 1 | UPPER | Air flows to upper body |
| 2 | U/F | Air flows to upper body and feet |

-continued

| Value | Description | Remarks |
|---|---|---|
| 3 | FEET | Air flows to feet |
| 4 | F/D | Air flows to feet and windshield defogger |

Remarks

N/A

3.3.2.18. Air Outlet (2nd Row) Command

Request to set 2nd row air outlet mode

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks

N/A

3.3.2.19. Air Recirculation Command

Request to set air recirculation mode

Values

| Value | Description | Remarks |
|---|---|---|
| 0 | No request | |
| 1 | ON | |
| 2 | OFF | |

Remarks

N/A

3.3.2.20. AC Mode Command

Request to set AC mode

Values

| Value | Description | Remarks |
|---|---|---|
| 0 | No request | |
| 1 | ON | |
| 2 | OFF | |

Remarks

N/A

3.3.2.21. Turnsignal Status

Values

| Value | Description | Remarks |
|---|---|---|
| 0 | OFF | |
| 1 | Left | |
| 2 | Right | |
| 3 | Invalid | |

Remarks

N/A

3.3.2.22. Headlight Status

Values

| Value | Description | Remarks |
|---|---|---|
| 0 | OFF | |
| 1 | TAIL | |
| 2 | Lo | |

-continued

| Value | Description | Remarks |
|---|---|---|
| 3 | Reserved | |
| 4 | Hi | |
| 5-6 | Reserved | |
| 7 | Invalid | |

Remarks

N/A

3.3.2.23. Hazardlight Status

Values

| Value | Description | Remarks |
|---|---|---|
| 0 | OFF | |
| 1 | Hazard | |
| 2 | Reserved | |
| 3 | Invalid | |

Remarks

N/A

3.3.2.24. Horn Status

Values

| Value | Description | Remarks |
|---|---|---|
| 0 | OFF | |
| 1 | ON | |
| 2 | Reserved | |
| 3 | Invalid | |

Remarks

In the case that 3.3.2.4 the Horn Pattern Command is active, the Horn status is "1" even if there are OFF periods in some patterns.

3.3.2.25. Front Windshield Wiper Status

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks

N/A

3.3.2.26. Rear Windshield Wiper Status

Values

| Value | Description | Remarks |
|---|---|---|
| 0 | OFF | |
| 1 | Lo | |
| 2 | Reserved | |
| 3 | INT | |
| 4-5 | Reserved | |
| 6 | Fail | |
| 7 | Invalid | |

Remarks

N/A

3.3.2.27. HVAC (1st Row) Status

| Value | Description | Remarks |
|---|---|---|
| 0 | OFF | |
| 1 | ON | |

Remarks
  N/A

3.3.2.28. HVAC (2nd Row) Status
Values

| Value | Description | Remarks |
|---|---|---|
| 0 | OFF | |
| 1 | ON | |

Remarks
  N/A

3.3.2.29. Target Temperature (1st Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.30. Target Temperature (1st Right) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.31. Target Temperature (2nd Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.32. Target Temperature (2nd Right) Status

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.33. HVAC Fan (1st Row) Status
Values

| Value | Description | Remarks |
|---|---|---|
| 0 | OFF | |
| 1 to 7 | Fan Level | |
| 8 | Undefined | |

Remarks
  N/A

3.3.2.34. HVAC Fan (2nd Row) Status
Values

| Value | Description | Remarks |
|---|---|---|
| 0 | OFF | |
| 1 to 7 | Fan Level | |
| 8 | Undefined | |

Remarks
  N/A

3.3.2.35. Air Outlet (1st Row) Status

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks
  N/A

3.3.2.36. Air Outlet (2nd Row) Status
Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks
  N/A

3.3.2.37. Air Recirculation Status

| Value | Description | Remarks |
|---|---|---|
| 0 | OFF | |
| 1 | ON | |

Remarks
  N/A

3.3.2.38. AC Mode Status
Values

| Value | Description | Remarks |
|---|---|---|
| 0 | OFF | |
| 1 | ON | |

Remarks

N/A

3.3.2.39. Seat Occupancy (1st Right) Status
Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.41. Seat Belt (1st Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.42. Seat Belt (2nd Left) Status

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.43. Seat Belt (2nd Right) Status
Values

| Values | | |
|---|---|---|
| Value | Description | Remarks |
| 0 | Buckled | |
| 1 | Unbuckled | |
| 2 | Undetermined | In case where sensor does not work just after IG-ON |
| 3 | Reserved | |

Remarks cannot detect sensor failure

3.3.2.44. Seat Belt (3rd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.45. Seat Belt (3rd Center) Status

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.4. APIs for Power Control

3.4.1. API List for Power Control

3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
| --- | --- | --- |
| Signal Name | Description | Redundancy |
| Power mode status | Status of the current power mode of VP | N/A |

3.4.2. Details of Each API for Power Control 3.4.2.1. Power Mode Command

Request to Control Power Mode

Values

| Value | Description | Remarks |
| --- | --- | --- |
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Remarks

The state machine diagram of the power modes is shown in FIG. 20.

[Sleep]

Vehicle power off condition. In this mode, the main battery does not supply power to each system, and neither VCIB nor other VP ECUs are activated.

[Wake]

VCIB is awake by the auxiliary battery. In this mode, ECUs other than VCIB are not awake except for some of the body electrical ECUs.

[Driving Mode]

Vehicle power on condition. In this mode, the main battery supplies power to the whole VP and all the VP ECUs including VCIB are awake.

3.4.2.2. Power Mode Status

Values

| Value | Description | Remarks |
| --- | --- | --- |
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks

VCIB will transmit [Sleep] as Power_Mode_Status continuously for 3000 [ms] after executing the sleep sequence. And then, VCIB will shut down.

ADS should stop transmitting signals to VCIB while VCIB is transmitting [Sleep].

3.5. APIs for Failure Notification 3.5.1. API List for Failure Notification 3.5.1.1. Inputs

TABLE 10

| Input APIs for Failure Notification | | |
| --- | --- | --- |
| Signal Name | Description | Redundancy |
| N/A | N/A | N/A |

3.5.1.2. Outputs

TABLE 11

| Output APIs for Failure Notification | | |
| --- | --- | --- |
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification 3.5.2.1. Request for ADS Operation Values

| Value | Description | Remarks |
| --- | --- | --- |
| 0 | No request | |
| 1 | Need maintenance | |
| 2 | Need to be back to garage | |
| 3 | Need to stop immediately | |
| Others | Reserved | |

Remarks

This signal shows a behavior which the ADS is expected to do according to a failure which happened in the VP.

3.5.2.2. Impact Detection Signal

| Value | Description | Remarks |
| --- | --- | --- |
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
|---|---|---|
| 0 | Normal | — |
| 1 | Deterioration detected | — |

Remarks

N/A 3.5.2.4. Performance Deterioration of Propulsion System

Values

| Value | Description | Remarks |
|---|---|---|
| 0 | Normal | — |
| 1 | Deterioration detected | — |

Remarks

N/A 3.5.2.5. Performance Deterioration of Shift Control System

Values

| Value | Description | Remarks |
|---|---|---|
| 0 | Normal | — |
| 1 | Deterioration detected | — |

Remarks

N/A 3.5.2.6. Performance Deterioration of Immobilization System

Values

| Value | Description | Remarks |
|---|---|---|
| 0 | Normal | — |
| 1 | Deterioration detected | — |

Remarks

N/A 3.5.2.7. Performance Deterioration of Steering System

Values

| Value | Description | Remarks |
|---|---|---|
| 0 | Normal | — |
| 1 | Deterioration detected | — |

Remarks

N/A 3.5.2.8. Performance Deterioration of Power Supply System

Values

| Value | Description | Remarks |
|---|---|---|
| 0 | Normal | — |
| 1 | Deterioration detected | — |

Remarks

N/A 3.5.2.9. Performance Deterioration of Communication System

Values

| Value | Description | Remarks |
|---|---|---|
| 0 | Normal | — |
| 1 | Deterioration detected | — |

Remarks

N/A 3.6. APIs for Security 3.6.1. API List for Security 3.6.1.1. Inputs

TABLE 12

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security | | |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |

TABLE 13-continued

| Signal Name | Description | Redundancy |
|---|---|---|
| | Output APIs for Security | |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/ close of the vehicle platform | N/A |

3.6.2. Details of Each API for Security
3.6.2.1. Door Lock (front) command, Door Lock (rear) command

| Value | Description | Remarks |
|---|---|---|
| 0 | No Request | |
| 1 | Lock | Not supported in Toyota VP |
| 2 | Unlock | |
| 3 | Reserved | |

Remarks
   If ADK requests for unlocking front side, both front doors are unlocked.
   If ADK requests for unlocking rear side, both 2nd row and trunk doors are unlocked.
   If ADK requests for locking any door, it should use "Central door lock command."
   (The functionality for individual locking is not supported in Toyota VP.)
3.6.2.2. Central Door Lock Command
   Request to control all doors' lock
Values

| Value | Description | Remarks |
|---|---|---|
| 0 | No Request | |
| 1 | Lock (all) | |
| 2 | Unlock (all) | |
| 3 | Reserved | |

Remarks
   N/A
3.6.2.3. Device Authentication Signature the 1st Word, Device Authentication Signature the 2nd Word, Device Authentication Signature the 3rd Word, Device Authentication Signature the 4th Word, Device Authentication Seed the 1st Word, Device Authentication Seed the 2nd Word
   Device Authentication Signature the 1st word is presented in from 1st to 8th bytes of the signature.
   Device Authentication Signature the 2nd word is presented in from 9th to 16th bytes of the signature.
   Device Authentication Signature the 3rd word is presented in from 17th to 24th bytes of the signature.

Device Authentication Signature the 4th word is presented in from 25th to 32nd bytes of the signature.
   Device Authentication Seed the 1st word is presented in from 1st to 8th bytes of the seed.
   Device Authentication Seed the 2nd word is presented in from 9th to 16th bytes of the seed.
3.6.2.4. Door Lock (1st Left) Status
Values

| Value | Description | Remarks |
|---|---|---|
| 0 | Reserved | |
| 1 | Locked | |
| 2 | Unlocked | |
| 3 | Invalid | |

Remarks
   N/A
3.6.2.5. Door Lock (1st Right) Status

| Value | Description | Remarks |
|---|---|---|
| 0 | Reserved | |
| 1 | Locked | |
| 2 | Unlocked | |
| 3 | Invalid | |

Remarks
   N/A
3.6.2.6. Door Lock (2nd Left) Status
Values

| Value | Description | Remarks |
|---|---|---|
| 0 | Reserved | |
| 1 | Locked | |
| 2 | Unlocked | |
| 3 | Invalid | |

Remarks
   N/A
3.6.2.7. Door Lock (2nd Right) Status
Values

| Value | Description | Remarks |
|---|---|---|
| 0 | Reserved | |
| 1 | Locked | |
| 2 | Unlocked | |
| 3 | Invalid | |

Remarks
   N/A
3.6.2.8. Door Lock Status of all Doors
Values

| Value | Description | Remarks |
|---|---|---|
| 0 | Reserved | |
| 1 | All Locked | |
| 2 | Anything Unlocked | |
| 3 | Invalid | |

Remarks
   In case any doors are unlocked, "Anything Unlocked."
   In case all doors are locked, "All Locked."

51

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks

N/A

3.6.2.9.1. Trip Counter

This counter is incremented in a unit of trips by the Freshness Value management master ECU.

Values

0-FFFFh

Remarks

This value is used to create a Freshness value.

For details, please refer to the other material [the specification of Toyota's MAC module].

3.6.2.9.2. Reset Counter

This counter is incremented periodically by the Freshness Value management master ECU.

Values

0-FFFFFh

Remarks

This value is used to create a Freshness value.

For details, please refer to the other material [the specification of Toyota's MAC module].

3.6.2.10. 1st Left Door Open Status

Status of the current 1st-left door open/close of the vehicle platform

| Value | Description | Remarks |
|---|---|---|
| 0 | Reserved | |
| 1 | Open | |
| 2 | Closes | |
| 3 | Invalid | |

Remarks

N/A

3.6.2.11. 1st Right Door Open Status

Status of the current 1st-right door open/close

Values

| Value | Description | Remarks |
|---|---|---|
| 0 | Reserved | |
| 1 | Open | |
| 2 | Close | |
| 3 | Invalid | |

Remarks

N/A

3.6.2.12. 2nd Left Door Open Status

Status of the current 2nd-left door open/close

| Value | Description | Remarks |
|---|---|---|
| 0 | Reserved | |
| 1 | Open | |

52

-continued

| Value | Description | Remarks |
|---|---|---|
| 2 | Close | |
| 3 | Invalid | |

Remarks

N/A

3.6.2.13. 2nd Right Door Open Status

Status of the current 2nd-right door open/close

Values

| Value | Description | Remarks |
|---|---|---|
| 0 | Reserved | |
| 1 | Open | |
| 2 | Close | |
| 3 | Invalid | |

Remarks

N/A

3.6.2.14. Trunk Status

Status of the current trunk door open/close

Values

| Value | Description | Remarks |
|---|---|---|
| 0 | Reserved | |
| 1 | Open | |
| 2 | Close | |
| 3 | Invalid | |

Remarks

N/A

3.6.2.15. Hood Open Status

Status of the current hood open/close

Values

| Value | Description | Remarks |
|---|---|---|
| 0 | Reserved | |
| 1 | Open | |
| 2 | Close | |
| 3 | Invalid | |

Remarks

N/A

4. API Guides to control Toyota Vehicles

This section shows in detail the way of using APIs for Toyota vehicles.

4.1. APIs for Vehicle Motion Control

4.1.1. API List for Vehicle Motion Control

Input and output APIs for vehicle motion control are shown in Table 14 and Table 15, respectively. Usage guides of some APIs are presented in the following sections as indicated in each table.

4.1.1.1. Inputs

TABLE 14

| Input APIs for Vehicle Motion Control | | | |
|---|---|---|---|
| Signal Name | Description | Redundancy | Usage Guide |
| Propulsion Direction Command | Request for shift change from/to forward (D range) to/from back (R range) | N/A | 4.1.2.1 |

TABLE 14-continued

Input APIs for Vehicle Motion Control

| Signal Name | Description | Redundancy | Usage Guide |
|---|---|---|---|
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |

TABLE 14-continued

Input APIs for Vehicle Motion Control

| Signal Name | Description | Redundancy | Usage Guide |
|---|---|---|---|
| Vehicle Mode Command | Request for changing from/ to manual mode to/from Autonomous Mode | Applied | 4.1.2.6 |
| High Dynamics Command | Request for increasing braking response performance* | Applied | — |

*Reaction time in VP upon a request from ADK

4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API guides in Details for Vehicle Motion Control 4.1.2.1. Propulsion Direction Command Please refer to 3.2.2.1 for value and remarks in detail.

FIG. 21 shows shift change sequences in detail.

First deceleration is requested by Acceleration Command and the vehicle is stopped. When Traveling direction is set to "standstill", any shift position can be requested by Propulsion Direction Command. (In FIG. 21, "D" "R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

FIG. 22 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

The state machine of mode transition for Autono-MaaS vehicle is shown in FIG. 24.

The explanation of each state is shown as follows.

| State | Description |
| --- | --- |
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

Acceleration Command is set as Deceleration (<0). And then Standstill Status is changed to "Applied". On the other hand, in case where Standstill Command is set as "Released", brakehold function is deactivated.

FIG. 23 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

The explanation of each transition is shown as follows.

| Transition | Conditions |
| --- | --- |
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control
4.2.1. API List for BODY Control
4.2.1.1. Inputs

TABLE 16

| | Input APIs for BODY Control | | |
| --- | --- | --- | --- |
| Signal Name | Description | Redundancy | Usage Guide |
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

| | Output APIs for BODY Control | | |
| --- | --- | --- | --- |
| Signal Name | Description | Redundancy | Usage Guide |
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |

TABLE 17-continued

| Signal Name | Description | Redundancy | Usage Guide |
|---|---|---|---|
| Output APIs for BODY Control | | | |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control

4.3.1. API List for Power Control

4.3.1.1. Inputs

TABLE 18

| Signal Name | Description | Redundancy | Usage Guide |
|---|---|---|---|
| Input APIs for Power Control | | | |
| Power mode command | Command to control the power mode of VP | N/A | — |

4.3.1.2. Outputs

TABLE 19

| Signal Name | Description | Redundancy | Usage Guide |
|---|---|---|---|
| Output APIs for Power Control | | | |
| Power mode status | Status of the current power mode of VP | N/A | — |

4.4. APIs for Failure Notification

4.4.1. API List for Failure Notification

4.4.1.1. Inputs

TABLE 20

| Signal Name | Description | Redundancy | Usage guide |
|---|---|---|---|
| Input APIs for Failure Notification | | | |
| N/A | — | — | — |

4.4.1.2. Outputs

TABLE 21

| Signal Name | Description | Redundancy | Usage guide |
|---|---|---|---|
| Output APIs for Failure Notification | | | |
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | | Applied | — |
| Performance deterioration of Power supply system | | Applied | — |
| Performance deterioration of Communication system | | Applied | — |

4.5. APIs for Security

4.5.1. API List for Security

Input and output APIs for Security are shown in Table 22 and Table 23, respectively. Usage guides of some APIs are presented in the following sections as indicated in each table.

4.5.1.1. Inputs

TABLE 22

| Signal Name | Description | Redundancy | Usage Guide |
|---|---|---|---|
| Input APIs for Security | | | |
| Door Lock (front) command | Command to control 1st both doors lock | N/A | — |

TABLE 22-continued

| | Input APIs for Security | | |
|---|---|---|---|
| Signal Name | Description | Redundancy | Usage Guide |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

| | Output APIs for Security | | |
|---|---|---|---|
| Signal Name | Description | Redundancy | Usage Guide |
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security
4.5.2.1. Device Authentication Protocol Device authentication is applied when the VCIB is activated from "Sleep" mode.

After the authentication succeeds, the VCIB can start to communicate with ADK.

Authentication process is as shown in FIG. 25 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described above, it should be understood that the embodiment disclosed herein is illustrative and non-restrictive in every respect. The technical scope in the present disclosure is defined by the terms of the claims and is intended to include any modifications within the scope and meaning equivalent to the terms of the claims.

What is claimed is:

1. A vehicle on which an autonomous driving system is mountable, the vehicle comprising:

a vehicle platform that carries out vehicle control in accordance with a command from the autonomous driving system, the vehicle platform including:

a vehicle body;

a braking system;

a powertrain including at least one of an engine and a motor;

a steering system;

a front wiper; and a front wiper switch for a user to give an instruction about an operation of the front wiper; and a vehicle control interface box that interfaces between the vehicle platform and the autonomous driving system, the vehicle control interface box including:

a memory that stores:

a program; and correspondence information for determination of an operation status of the front wiper; and a processor that executes the stored program to perform the following functions:

accepting an operation request for the front wiper from the autonomous driving system; and when a user instruction from the front wiper switch and the accepted operation request are different from each other, determining the operation status of the front wiper to be a more active setting between the user instruction for the front wiper switch and the accepted operation request, based on the stored correspondence information, and operating the front wiper in accordance with the determined operation status.

2. The vehicle according to claim 1, wherein when one of the user instruction from the front wiper switch and the accepted operation request indicates a HI mode, the processor determines the HI mode as the operation status of the front wiper.

* * * * *